United States Patent
Kim et al.

(10) Patent No.: US 10,477,460 B2
(45) Date of Patent: Nov. 12, 2019

(54) COMMUNICATION METHOD AND APPARATUS IN WIRELESS COMMUNICATION SYSTEM SUPPORTING D2D COMMUNICATION

(71) Applicant: Samsung Electronics Co., Ltd., Suwon-si, Gyeonggi-do (KR)

(72) Inventors: Sung-Hoon Kim, Suwon-si (KR); Young-Kyo Baek, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/858,337

(22) Filed: Sep. 18, 2015

(65) Prior Publication Data

US 2016/0088668 A1  Mar. 24, 2016

Related U.S. Application Data

(60) Provisional application No. 62/052,680, filed on Sep. 19, 2014.

(51) Int. Cl.
*H04W 48/16* (2009.01)
*H04W 88/04* (2009.01)

(52) U.S. Cl.
CPC ............ *H04W 48/16* (2013.01); *H04W 88/04* (2013.01)

(58) Field of Classification Search
CPC ... H04W 76/023; H04W 76/06; H04W 4/005; H04W 8/005; H04W 48/16; H04W 88/04
See application file for complete search history.

(56) References Cited

U.S. PATENT DOCUMENTS

| | | | |
|---|---|---|---|
| 2014/0056220 A1* | 2/2014 | Poitau | H04W 40/246 370/328 |
| 2014/0120934 A1 | 5/2014 | Kishiyama | |
| 2015/0029866 A1* | 1/2015 | Liao | H04W 4/008 370/241 |
| 2016/0044613 A1* | 2/2016 | Cai | H04W 56/00 370/315 |

FOREIGN PATENT DOCUMENTS

| | | |
|---|---|---|
| EP | 2 733 971 A1 | 5/2014 |
| WO | 2010/031427 A1 | 3/2010 |
| WO | 2013/002206 A1 | 1/2013 |

(Continued)

OTHER PUBLICATIONS

ETRI, Discussion on Relaying for D2D Proximity Services, R2-132592, 3GPP TSG-RAN WG2 Meeting #83, Aug. 9, 2013, Barcelona, Spain.

(Continued)

*Primary Examiner* — Jianye Wu
(74) *Attorney, Agent, or Firm* — Jefferson IP Law, LLP

(57) ABSTRACT

A communication method in a wireless communication system supporting device-to-device (D2D) communication is provided. The communication method includes transmitting a first message including information for identifying a relay to discover a relay user equipment (UE) that performs a relay function in the D2D communication, and receiving a second message including information about the relay UE that performs the relay function, from the relay UE that has received the first message, the second message being transmitted in response to the first message.

24 Claims, 15 Drawing Sheets

(56) References Cited

FOREIGN PATENT DOCUMENTS

| WO | 2013/111104 A1 | 8/2013 |
| WO | 2013/163599 A2 | 10/2013 |
| WO | 2014/092305 A1 | 6/2014 |
| WO | 2014/113073 A1 | 7/2014 |

OTHER PUBLICATIONS

Renesas Mobile Europe Ltd., Connection Setup Via ProSe US-to-Network Relay, SA WG2 Meeting #97, May 27-31, 2013, S2-131971, Busan, South Korea.
European Search Report dated Jul. 18, 2017, issued in the European Application No. 15841925.9.

* cited by examiner

COMMUNICATION METHOD AND APPARATUS IN WIRELESS COMMUNICATION SYSTEM SUPPORTING D2D COMMUNICATION

CROSS-REFERENCE TO RELATED APPLICATION(S)

This application claims the benefit under 35 U.S.C. § 119(a) of a U.S. Provisional patent application filed on Sep. 19, 2014 in the United States Patent and Trademark Office and assigned Ser. No. 62/052,680, the entire disclosure of which is hereby incorporated by reference.

TECHNICAL FIELD

The present disclosure relates to a communication method and apparatus in a wireless communication system supporting device-to-device (D2D) communication.

BACKGROUND

To meet the demand for wireless data traffic, which has increased since the deployment of $4^{th}$-generation (4G) communication systems, many efforts have been made to develop an improved $5^{th}$-generation (5G) or a pre-5G communication system. For this reason, the 5G or pre-5G communication system is called a Beyond 4G Network communication system or a Post long-term evolution (LTE) communication system.

The 5G communication system has been considered to be implemented in a millimeter Wave (mmWave) band (e.g., 60 GHz band) to achieve a high data transfer rate. To reduce a propagation loss of radio waves and increase a transmission distance of radio waves in the mmWave band, beamforming technology, massive multiple-input multiple-output (MIMO) technology, full dimensional MIMO (FD-MIMO) technology, array antenna technology, analog beamforming technology and large scale antenna technology are under discussion in the 5G communication system.

Further, for improvement of the system network, development of technologies such as evolved small cell, advanced small cell, cloud radio access network (cloud RAN), ultra-dense network, device-to-device (D2D) communication, wireless backhaul, moving network, cooperative communication, coordinated multi-points (CoMP), and receiving-end interference cancellation is being considered in the 5G communication system.

In addition, hybrid frequency shift keying (FSK) and quadrature amplitude modulation (QAM) modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access technologies, have been developed in the 5G system.

On the other hand, the Internet has evolved from the human-centered connection network in which humans create and consume information, into the Internet of things (IoT) network in which distributed components exchange and process information. Internet of everything (IoE) technology may be an example in which large volume data processing technology based on the connection to a cloud server and the like is combined with the IoT technology.

To implement IoT, technical elements such as sensing technology, wired/wireless communication and network infrastructure, service interface technology and security technology are required, so technologies for the connection between things, such as sensor network, machine to machine (M2M) and machine type communication (MTC), have been recently studied.

In the IoT environment, an intelligent Internet technology (IT) service may be provided, which collects and analyzes data created from connected devices to create new value. The IoT may be applied to various devices such as a smart home, a smart building, a smart city, a smart car or a connected car, a smart grid, a healthcare service, a smart home appliance, and an advanced medical service, through the convergence of existing IT technology and various industries.

Accordingly, various attempts have been made to apply the 5G communication system to the IoT network. For example, the technologies such as a sensor network, M2M and MTC may be implemented by the techniques such as beamforming, MIMO, and array antenna, which are 5G communication technologies. Applying the cloud RAN and large volume data processing technology to the IoT network may also be an example of the convergence between the 5G technology and the IoT technology.

D2D communication for performing direct communication between devices using the wireless communication system may be implemented, and since the D2D communication is operated based on the proximity between user equipments (UEs) or between devices, a D2D communication service may be referred to as a proximity-based service (ProSe). As used herein, the terms 'device' and 'UE' are used interchangeably. The ProSe is a proximity-based service that uses D2D communication proposed by $3^{rd}$ generation partnership project (3GPP), and reference may be made to 3GPP TS23.303, for the basis system configuration for providing the ProSe. In the D2D communication, a service may be used through direct communication between UEs. In the D2D communication, a UE performs a discovery operation to find another UE that the UE is interested in, or performs an operation for communicating with another UE that the UE is interested in.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an efficient method and apparatus for discovery of a user equipment (UE) in a wireless communication system supporting device-to-device (D2D) communication.

Another aspect of the present disclosure is to provide an efficient method and apparatus for a D2D relay in a wireless communication system.

Another aspect of the present disclosure is to provide a method and apparatus for a D2D relay for a UE that is outside of coverage in a wireless communication system.

In accordance with an aspect of the present disclosure, a communication method in a wireless communication system supporting D2D communication is provided. The communication method includes transmitting a first message including information for identifying a relay to discover a relay UE that performs a relay function in the D2D communication, and receiving a second message including information about the relay UE from the relay UE that received the first message, the second message being transmitted in response to the first message.

In accordance with another aspect of the present disclosure, a UE in a wireless communication system supporting D2D communication is provided. The UE includes a transceiver configured to transmit and receive data using the D2D communication, and a controller configured to transmit a first message including information for identifying a relay to discover a relay UE that performs a relay function in the D2D communication, and to receive a second message including information about the relay UE from the relay UE that received the first message, the second message being transmitted in response to the first message.

In accordance with further another aspect of the present disclosure, a communication method in a wireless communication system supporting D2D communication is provided. The communication method includes receiving a first message including information for identifying a relay, the first message for discovering a relay user equipment (UE) that performs a relay function in the D2D communication, and, in response to receiving the first message, transmitting a second message including information about the relay UE.

In accordance with yet another aspect of the present disclosure, a UE in a wireless communication system supporting D2D communication is provided. The UE includes a transceiver configured to transmit and receive data using the D2D communication, and a controller configured to receive a first message including information for identifying a relay, the first message for discovering a relay UE that performs a relay function in the D2D communication, and to transmit a second message including information about the UE as the relay UE that performs the relay function, in response to the received first message.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
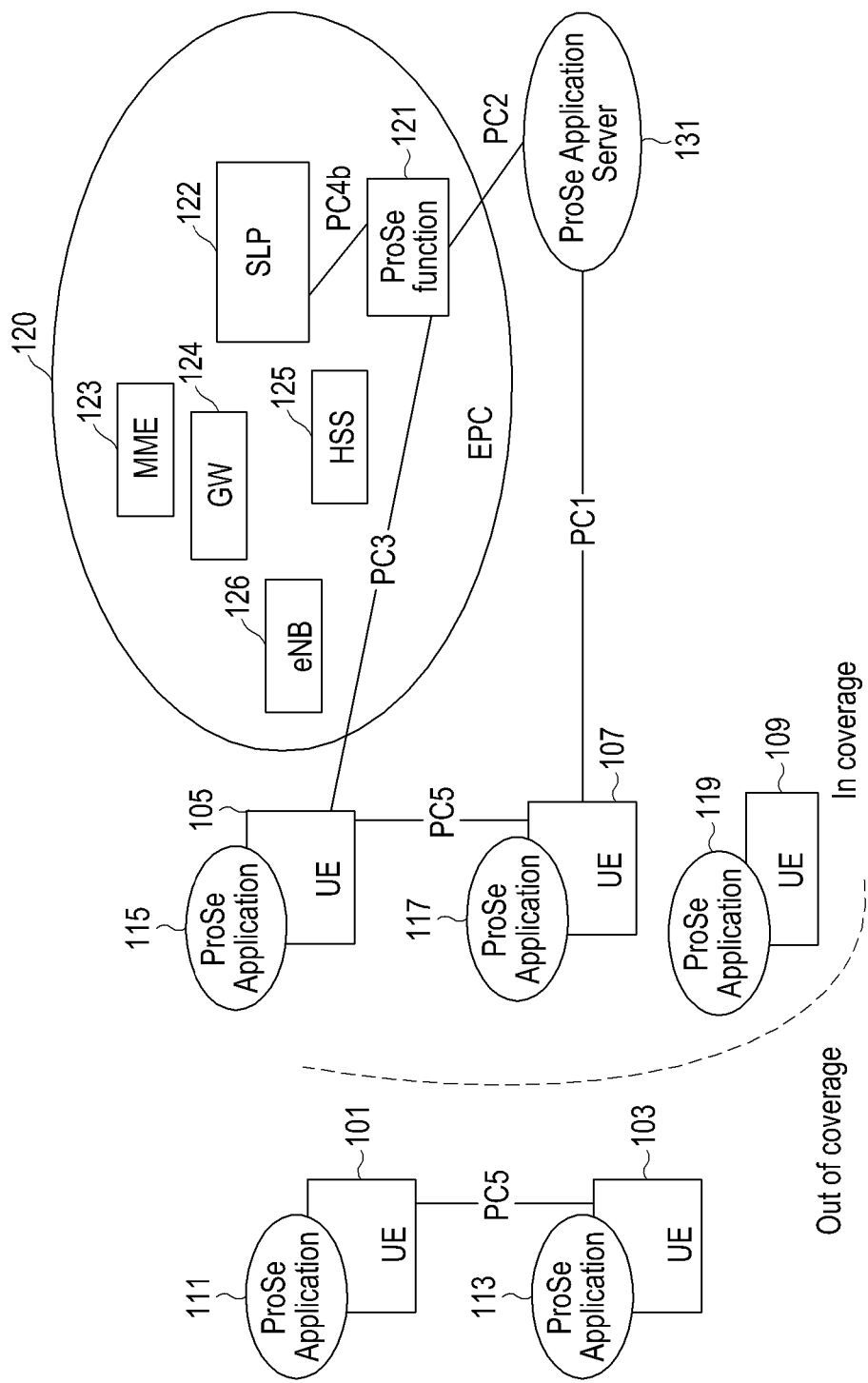
FIG. 1 illustrates a configuration of a wireless communication system supporting device-to-device (D2D) communication for proximity-based service (ProSe) between user equipments (UEs) according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A below-described communication method in device-to-device (D2D) communication proposes various schemes for discovering a user equipment (UE) that operates as a D2D relay. Further, various schemes are disclosed for establishing and releasing a connection associated with relay in D2D communication.

In the following embodiments, the wireless communication system supporting D2D communication is described as a long-term evolution (LTE) system in $3^{rd}$ generation partnership project (3GPP). However, the present disclosure is not limited to the LTE system, and may be applied to other wireless communication systems.

D2D communication may be used for commercial purposes, and may also be used for the public safety. In the D2D communication, a UE may announce and monitor a discovery message to perform a discovery operation.

In a proximity-based service (ProSe), there are two types of discovery schemes. A first discovery scheme is an open discovery scheme that uses a discovery service for an application without restricting the user. A second discovery scheme is a restricted discovery scheme that requires permission for a particular user, and through the permission, a user may restrict who may discover the user.

To receive a D2D discovery service, a user of D2D communication using the open discovery may negotiate with a ProSe controller (hereinafter, a ProSe function) using a ProSe application identifier (ID). The ProSe application ID is information required to provide a ProSe service in the ProSe function. The ProSe function may generate a ProSe application code for announcing a discovery message and a discovery filter for monitoring the discovery message based on the ProSe application ID, and deliver (or provide) the ProSe application code and the discovery filter to an announcing UE and a monitoring UE in D2D communication, respectively. A D2D UE (i.e., the announcing UE) that announces the discovery message may start announcement of the discovery message after receiving the ProSe application code from the ProSe function. A D2D UE (i.e., the monitoring UE) that monitors the discovery message may start monitoring of the discovery message after receiving the discovery filter from the ProSe function.

Further, the ProSe may connect to the network through relay with a remote UE outside of the coverage of an evolved Node B (eNB), for public safety. The remote UE may discover a relay UE that provides a relay function using the open discovery scheme, and access the network by connecting with the relay UE. The relay UE, which plays a role of a delegate that assigns an IP address, may assign an IP address to the remote UE. The remote UE may start communication by using the assigned IP address as a source IP, and the network may not determine whether the remote UE is outside of the coverage. The remote UE may transmit to the relay UE a packet in which its own layer 2 ID (e.g., a ProSe user ID of the remote UE) is included in a source ID of a layer 2 message and a layer 2 ID of the relay UE is included in a destination ID of the layer 2 message in the network layer. For the layer 2 IDs, the remote UE and the relay UE may share them, and may follow the configuration information that is provided in advance by the network. By checking a destination ID of the packet in the layer 2 message, the relay UE may determine that the packet is delivered to the relay UE, and may identify the remote UE by checking a source ID of a received packet, and then transmit data included in the received packet to the network. The relay UE may transmit the data to the network through a packet network connection.

First, a method for discovering a UE in relation to D2D relay in an embodiment of the present disclosure will be described.

In ProSe proposed by 3GPP, for discovery between UEs, evolved packet core (EPC) level discovery may be used within evolved universal terrestrial radio access network (E-UTRAN) coverage and direct discovery may be used outside the UTRAN coverage. In the event that D2D communication is used during an emergency, two discovery methods of the EPC level discovery and the direct discovery may coexist in the vicinity of the boundary of the UTRAN coverage, and a discovery method between a UE that is outside of the UTRAN coverage and a UE in the UTRAN coverage may be required. Therefore, an embodiment of the present disclosure may provide a UE's operation for the coexistence of the EPC level discovery and the direct discovery, and a D2D relay method for relaying a UE outside of the E-UTRAN coverage. Further, an embodiment of the present disclosure may provide a UE's communication method performed when a UE is outside of the E-UTRAN coverage, and a communication method for a UE with a D2D relay function, which is in the vicinity of the UE.

FIG. 1 illustrates a configuration of a wireless communication system supporting D2D communication for ProSe between UEs according to an embodiment of the present disclosure.

Referring to FIG. 1, a plurality of UEs 101, 103, 105, 107 and 109 (100) may include ProSe applications 111, 113, 115, 117 and 119 (110) for a proximity service, respectively, and perform D2D communication with another UE. In the example of FIG. 1, the UEs 105, 107 and 109 are within an E-UTRAN coverage and the UEs 101 and 103 outside of the E-UTRAN coverage.

An EPC 120 is a core network of the LTE system, and the EPC 120 may include a ProSe function 121, a secure user plane location (SUPL) location platform (SLP) 122, a mobility management entity (MME) 123, a gateway (GW) 124, a home subscriber server (HSS) 125, and an eNB 126. The ProSe function 121 is in charge of the logical function used for network-related behaviors required for ProSe in the ProSe network. The SLP 122 is in charge of the control and positioning for a SUPL service. The MME 123 receives subscription information related to ProSe from the HSS 125 that stores and manages user's subscription information, and notifies the E-UTRAN that the UE is permitted to use ProSe. The GW 124 may include a serving gateway (S-GW) and a packet data network (PDN) gateway (P-GW), which are in charge of data transmission in the user plane. Further, a ProSe application server 131 may store EPC ProSe user IDs and ProSe application IDs, and map application layer user IDs to EPC ProSe user IDs.

Further, PC1 to PC5 represent interfaces in the ProSe network. PC1 is an interface between the ProSe application 110 of the UE 100 and the ProSe application server 131, and is for application-level signaling. PC2 is an interface between the ProSe application server 131 and the ProSe function 121. PC3 is an interface between the UE 100 and the Prose function 121, and PC4b is an interface between the SLP 122 and ProSe function 121. PC5 is an interface between the any of the UEs 101, 103, 105, 107, and 109.

A UE may receive information used for discovery, such as Configuration and EPC ProSe user ID for a ProSe service, from the ProSe function 121 of the EPC 120 through a registration procedure. If the UE requests discovery to find another UE, the ProSe function 121 may find the other UE that the UE desires to discover, find an EPC ProSe user ID of the other UE through interworking with the ProSe application server 131, request the location of the other UE from the SLP 122 to find the location of the other UE if the UEs 100 are in proximity to each other, and notify the UE of the proximity of the other UE. The EPC ProSe user ID is an identifier for EPC level ProSe Discovery supporting direct communication, which is provided to uniquely identify the UE registered for ProSe, and the EPC ProSe user ID may be reassigned by the ProSe function 121.

When the UE is outside of coverage, the UE may use the discovery information that is assigned in advance and shared, for direct discovery. For example, the shared discovery information may include D2D frequency channel information, a group ID and a code of a group to which the UE belongs, application layer user ID, ProSe application code and the like. The group ID is a group identifier of, for example, layer 2, by which a lower layer can identify a set of users. The application layer user ID is an identifier for identifying a user in the context of a specific application. The ProSe application code is used in a discovery procedure and is associated with ProSe application ID.

As for a UE with a relay function, if the UE is in the E-UTRAN coverage, the UE may support EPC-level discovery by relaying for a UE outside of coverage and the EPC network.

The direct discovery scheme may be divided into two schemes of a model A and a model B. In model A, a UE may periodically or aperiodically transmit (or announce, broadcast) an announce message indicating the presence of the UE, and adjacent UEs may receive (or monitor) the announce message to determine that the UE that transmitted the announce message is adjacent thereto. In contrast, in the scheme of the model B, a UE may transmit (or broadcast) a search message if there is a UE(s) that the UE desires to find, and a UE that received a search message corresponding thereto, among adjacent UEs, may respond by sending a response message to notify that the UE is adjacent thereto.

For the model A in the direct discovery scheme, the UE that transmits (broadcasts or announces) the announce message will be referred to as an announcing UE, and the UE that receives (monitors or receives) the announce message will be referred to as a monitoring UE. For the model B, the UE that transmits the search message will be referred to as a discoverer UE, and the UE that can respond by receiving the search message in proximity to the discoverer UE will be referred to as a discoveree UE.

In the following description of embodiments of the present disclosure, for the direct discovery, an operation method of UEs will be described for each model.

An embodiment of the present disclosure provides a scheme in which, when a first UE moves outside of the E-UTRAN coverage, the first UE discovers a second UE that is outside of the E-UTRAN coverage to which the first UE is in proximity, using the direct discovery (i.e., model B).

Figure 2:
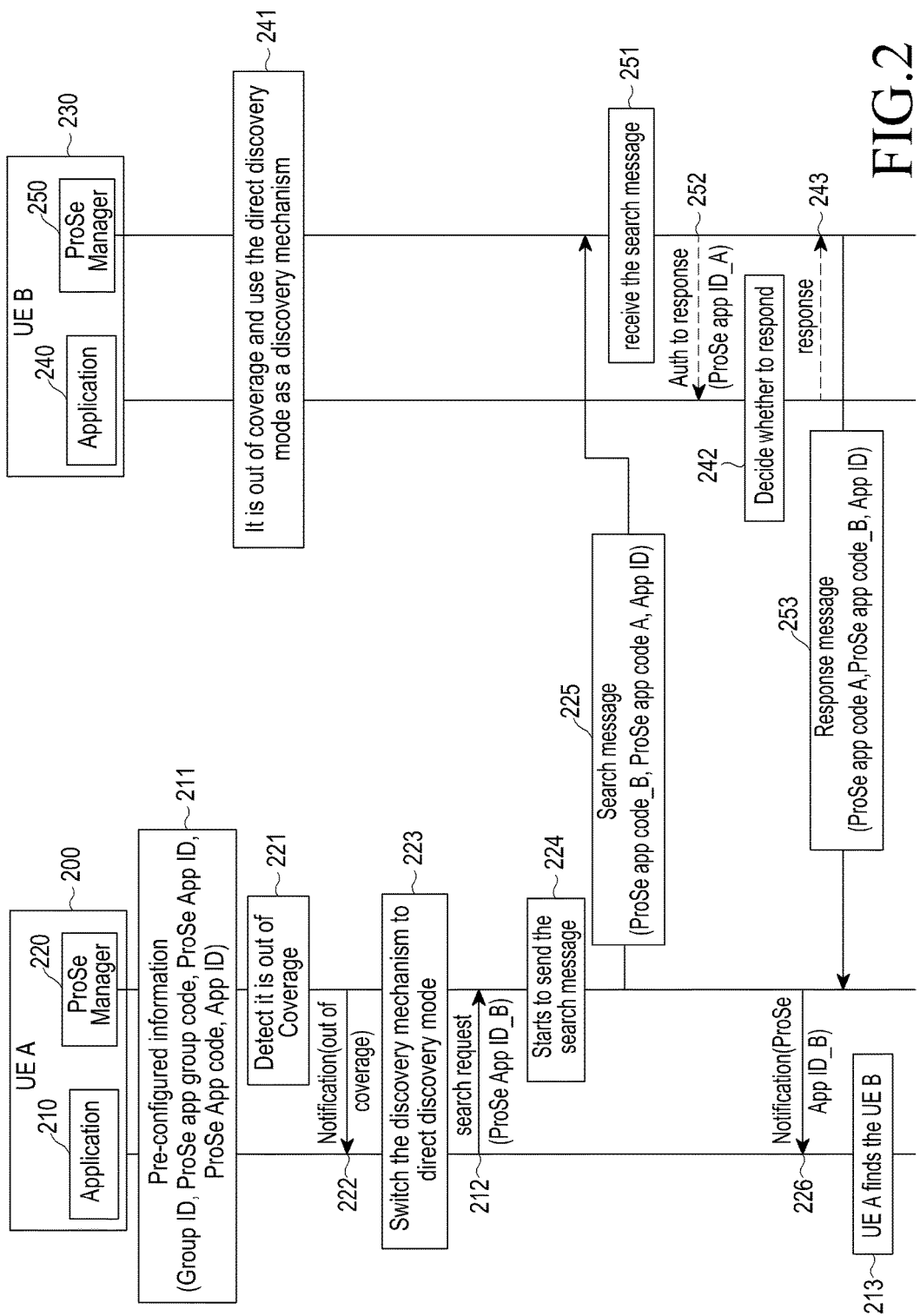
FIG. 2 is a flowchart of a direct discovery procedure according to an embodiment of the present disclosure.

FIG. 2 is a flowchart of a direct discovery procedure according to an embodiment of the present disclosure.

Referring to FIG. 2, a UE_A 200 may include a ProSe application 210 and a ProSe manager 220 for a discovery-related function in the EPC network. A UE_B 230 adjacent to the UE_A 200 may also include a ProSe application 240 and a ProSe manager 250 for the discovery-related function in the EPC network. In the embodiment of FIG. 2, the UE_A 200 and the UE_B 230 are located outside of the E-UTRAN coverage.

In operation 211, the UE_A 200 includes information that is configured in advance to perform direct discovery outside the E-UTRAN coverage. The information may be stored in advance in the UE_A 200, or may be provided from the network or through various paths when the UE_A 200 is in the E-UTRAN coverage. The information may include at least one of, for example, group members of a group to which the UE_A 200 belongs, a ProSe application ID (or an application layer user ID) used by the UE_A 200, a ProSe application code corresponding to the ProSe application ID, a group ID for identifying a group to which the UE_A 200 belongs, an Application ID identifying an application associated with a corresponding service (for example, a service for public safety) and a ProSe application group code corresponding to the group. If a value of the ProSe application code or the ProSe application group code is changed periodically or aperiodically, the UE may store a codebook or a parameter for generating the codes, and continuously update the code values depending on the situation.

In operation 221, UE_A 200 is determined to be outside of the E-UTRAN coverage, and the manager 220 may notify the application 210 that the UE_A 200 has moved outside of the E-UTRAN coverage, in operation 222. A modem of the UE_A 200 may notify the manager 220 that there is no E-UTRAN cell on which the UE_A 200 can camp, or notify the application 210 through direct notification.

Upon recognizing that the UE_A 200 is outside of the E-UTRAN coverage, the manager 220 or the application 210 may switch to the direct discovery mode in operation 223. Operation 223 may be optionally performed.

Thereafter, in operation 212, if the application 210 desires to find the UE_B 230 through direct discovery, the application 210 may send a search request including a ProSe application ID (hereinafter, referred to as a ProSe application ID_B) of the UE_B 230 to the manager 220. In operations 224 and 225, the manager 220 may broadcast (or transmit) a search message including a ProSe application code_B corresponding to the ProSe application ID_B. The ProSe application code_B may be understood as information (for example, ID of UE_B) about the target that the UE_A 200 is finding, since the ProSe application code_B is information about the UE_B 230 that the UE_A 200 is finding. Therefore, hereinafter, in related embodiments of the present invention, information associated with the ProSe application code may be understood as identification information of a corresponding UE (or Group), as described above, D2D communication may be used in public safety services such as fire and police. For example, in a case where firefighters perform D2D communication, the ProSe application code_B may be information about the target (i.e., another firefighter) that the UE_A 200 is finding in the group of adjacent firefighters. Further, as in the embodiment described below, in a case where the UE_B 230 performs an operation of a relay UE in D2D communication, the ProSe application code_B may be used as a relay service code indicating providing a fire-related relay or information indicating a fire-related relay provider. The search message may include at least one of a ProSe application code_A indicating the UE requesting the search, an application ID, and an expiration timer of how long the UE should wait for a response, in addition to the ProSe application code_B. The ProSe application code_A may be understood as information about a discoverer UE, since the ProSe application code_A is information about the UE_A 200 that transmits the search message.

In operation 241, the UE_B 230 is operating in the direct discovery mode by performing operations 211, 221, 222 and 223, like the UE_A 200. If the UE_B 230 receives the search message in operation 251, the manager 250 may ask the application 240 whether to transmit a response to the reception of the search message, in operations 252, 242 and 243. If the UE_B 230 is approved by the application 240 to transmit a response to the UE_A 200 or transmits a response through the predetermined setting, the UE_B 230 may transmit a response message for the received search message to the UE_A 200 in operation 253. The response message may include at least one of a ProSe application code_A of the UE_A 200 that has transmitted the search message, a ProSe application code_B of the UE_B 230 and an application ID. The ProSe application code_B may be understood as information about a discoveree UE, since the ProSe application code_B is information about UE_B 230 that receives the search message.

Thereafter, in operations 226 and 213, the manager 220 may notify the application 210 of the reception of the response message, thereby notifying that UE_B 230 is in proximity to UE_A 200.

In another embodiment of FIG. 2, for example, in a case where a UE_A desires to find a UE_B as a group member corresponding to a certain group with group ID_1, if the UE_A 200 includes (or inserts) the group ID_1 instead of the ProSe application ID_B into the search request when transmitting the search request in operation 212, the manager 220 of the UE_A 200 may include (or insert), into the search message, at least one of a ProSe application code_A indicating the UE requesting the search, an application ID, and an expiration timer about how long the UE should wait for a response, in addition to the group ID_1 which is an ID of a group that the UE desires to find, or a ProSe application group code_1 corresponding to the group, when generating the search message in operation 225.

The UE_B 230 operating in the direct discovery mode may receive the search message in operation 251, and if the manager 250 recognizes that the UE_B 230 is also a group member of the group with group ID_1, the manager 250 may deliver at least one of the ProSe application ID_A and group ID_1 to the application 240, notifying that the UE_A 200 is finding a group member of the group with group ID_1. In this way, the manager 250 of the UE_B 230 may ask the application 240 whether to transmit a response to the reception of the search message, and if the UE_B 230 is approved by the application 240 to transmit a response to the UE_A 200. The manager 250 may determine to transmit a response through the predetermined setting, and the UE_B 230 may transmit a response message for the received search message to the UE_A 200 in operation 253. The response message may include at least one of a ProSe application code_A of the UE_A 200 that has transmitted the search message, a ProSe application code_B of the UE_B 230, a group ID_1, a ProSe application group code_1 and an application ID. Thereafter, the manager 220 of the UE_A 200 that has received the response message may notify the application 210 of the reception of the response message, thereby notifying that the UE_B 230 which is a member of the group with group ID_1 is in proximity to the UE_A 200.

Described is a scheme in which when a UE goes outside of the E-UTRAN coverage, the UE discovers a relay UE to which the UE is in proximity, using the direct discovery (model B).

Figure 3A:
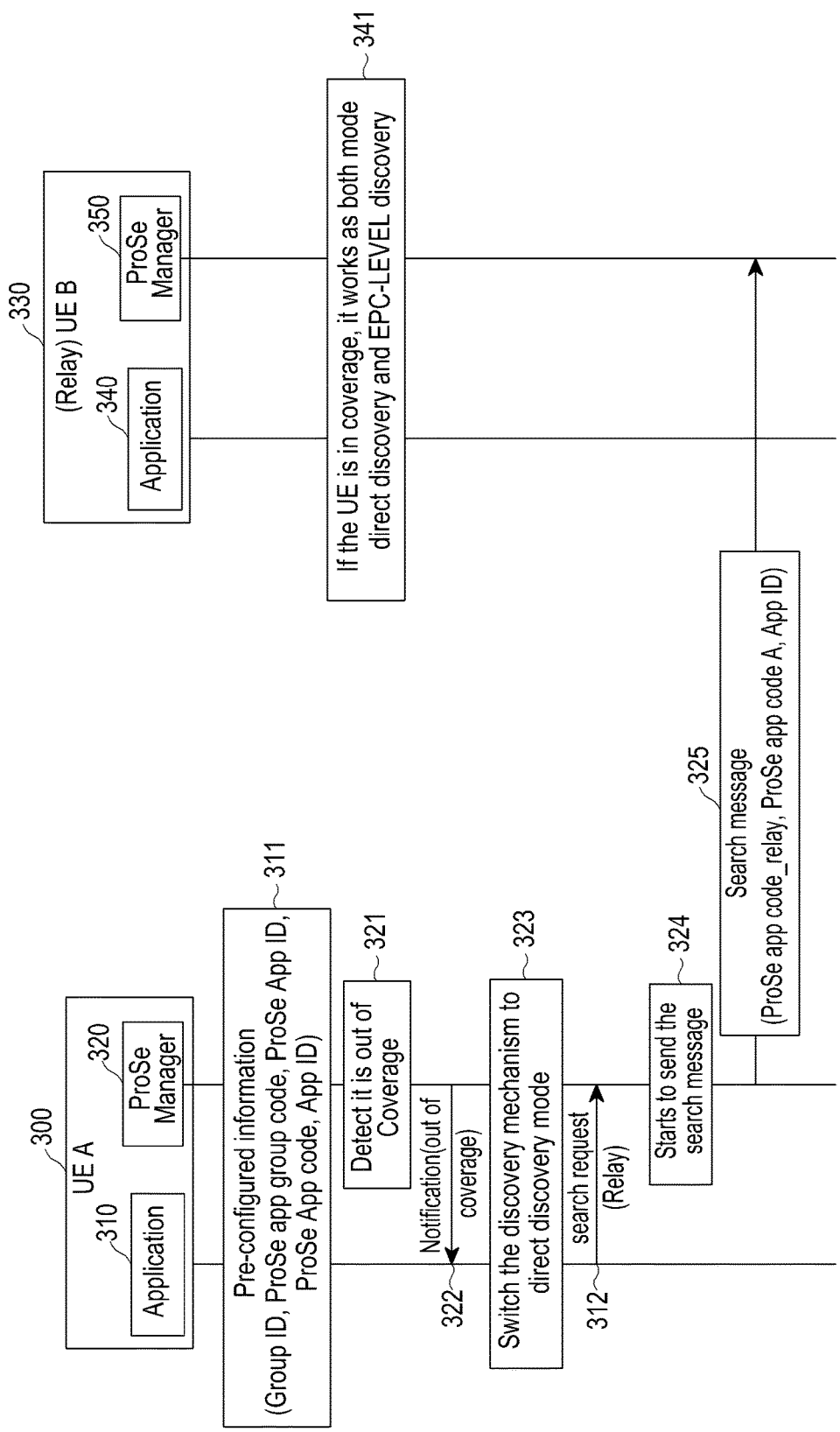
FIGS. 3A and 3B are flowcharts of another discovery procedure according to an embodiment of the present disclosure.
Figure 3B:
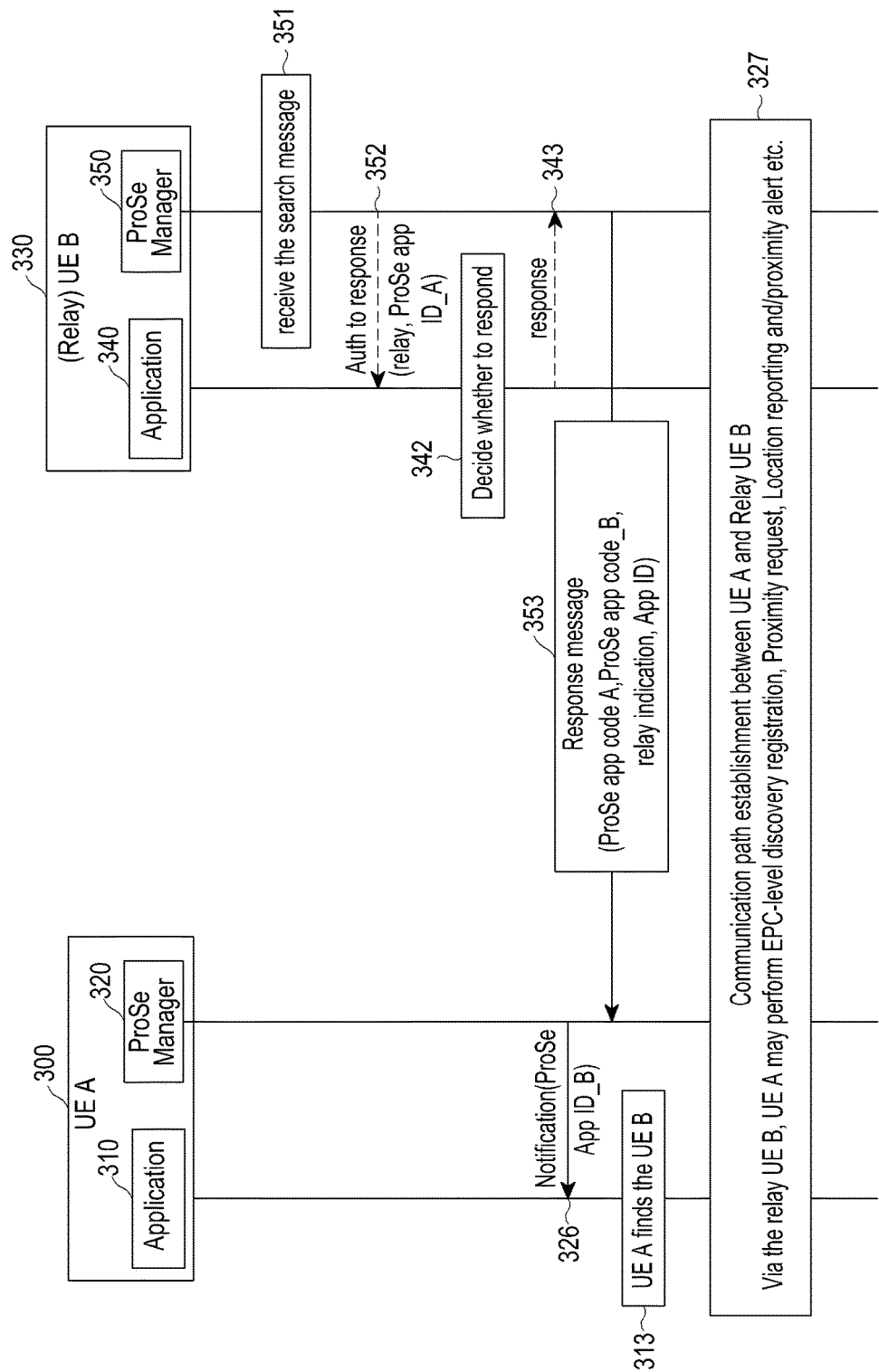

FIGS. 3A and 3B are flowcharts of another discovery procedure according to an embodiment of the present disclosure.

Referring to FIGS. 3A and 3B, a UE_A 300 may include a ProSe application 310 and a ProSe manager 320 that is responsible for a discovery-related function in the EPC network. A UE_B 330 adjacent to the UE_A 300 may also include a ProSe application 340 and a ProSe manager 350 that is responsible for the discovery-related function in the EPC network. In this embodiment, it is assumed that the UE_A 300 and the UE_B 330 are UEs located outside of the E-UTRAN coverage, and the UE_B 330 is capable of performing a relay function. In operation 311, the UE_A 300 is assumed to have the information to perform direct discovery outside the E-UTRAN coverage. The information may be stored in the UE_A 300, or may be provided from the network or through various paths when the UE_A 300 is in the E-UTRAN coverage. The information may include at least one of, for example, group members of a group to which the UE_A 300 belongs, a ProSe application ID (or an application layer user ID) used by the UE_A 300, a ProSe application code corresponding to the ProSe application ID, an Application ID identifying an application associated with a corresponding service (for example, a service for public safety), a group ID for identifying a group to which the UE_A 300 belongs, a ProSe application group code corresponding to the group, and a ProSe application code_relay indicating a relay UE. If a value of the ProSe application code, the ProSe application group code or the ProSe application code_relay is changed periodically or aperiodically, the UE may store a codebook or a parameter for generating the codes, and continuously update the code values depending on the situation.

In operation 321, when the UE_A 300 determines that it is outside of the E-UTRAN coverage, the manager 320 of the UE_A 300 may notify the application 310 that the UE_A 300 has moved outside of the E-UTRAN coverage, in operation 322. A way to determine that the UE_A 300 is outside of the coverage is to allow a modem (not shown) to notify the manager 320 that there is no E-UTRAN cell on which the UE_A 300 can camp, or notify the application 310 through direct notification.

Upon recognizing that the UE_A 300 is outside of the E-UTRAN coverage, the manager 320 or the application 310 may switch the discovery method to the direct discovery mode in operation 323. Operation 323 may be optionally performed.

Further, in a case where the application 310 of the UE_A 300 sends a search request indicating a search for a relay in operation 312, or in a case where the ProSe Manage 320 is set to find a relay UE if the UE_A 300 is outside of the E-UTRAN coverage, or in a case where the UE_A 300 finds a relay UE after a lapse of a predetermined time, the manager 320 may broadcast (or transmit) a search message including a ProSe application code_relay assigned to the relay UE in operations 324 and 325 in FIG. 3A. The ProSe application code_relay may be used as a relay service code indicating a relay associated with, for example, public safety, or information indicating a public safety related relay provider since the UE_B 330 is performs an operation of a relay UE in D2D communication.

The search message may include at least one of a ProSe application code_A indicating the UE requesting the search, an application ID, and an Expiration timer which is information about how long the UE should wait for a response, in addition to the ProSe application code_relay. The ProSe application code_A may be understood as information about a searcher UE, since the ProSe application code_A is information about the UE_A 300 that transmits the search message in the model B.

In operation 341, if the UE_B 330 with a relay function is in the E-UTRAN coverage, the UE_B 330 may operate in the EPC-level discovery mode, and may also operate in the direct discovery mode in order to perform the relay function. If the UE_B 330 receives the search message in operation 351, the manager 350 may ask the application 340 whether to send a response to the UE_A 300 as a relay node, in operation 352, or may ask the ProSe function in the EPC network whether the UE_B 330 is allowed to perform relay. The manager 350 may send a response message in operation 353 when the UE_B 330 is not restricted by the ProSe function for application of relay functions to the UE_A 300, when the manager 350 is permitted by the application 340 to send a response to the UE_A 300 through operations 352, 342 and 343, or when the manager 350 is set to send a response through a preset.

The response message may include at least one of a ProSe application code_A of the UE_A 300 that has transmitted the search message, a ProSe application code_B of the UE_B 330, a relay indication indicating the presence of the relay function, and an application ID.

Thereafter, in operations 326 and 313, the manager 320 of the UE_A 300 that has received the response message may notify the application 310 that the UE_B 330 is in proximity to the UE_A 300. This operation and operations 352, 342 and 343 may be optionally performed.

If the UE_A 300 fails to receive a response to the search message for finding a relay node, which is transmitted in operation 325, for a predetermined expiration time, the UE_A 300 may repeat a process of sending again the search message. If the UE_A 300 fails to receive a response while repeating the process of sending the search message and a response thereto a predetermined number of times, the UE_A 300 may not perform the search process, temporarily recognizing that there is no relay node near the UE_A 300, and after a lapse of a predetermined time, the UE_A 300 may restart the search process as in operation 325.

In operation 327, the UE_A 300 that has received the response message may establish a ProSe communication path to the UE_B 330 which is a relay UE, and perform EPC-level discovery via the communication path.

In this embodiment of the present disclosure, the UE_B 330 with a relay function may prepare or perform the relay function, without actually perform the relay function, by registering the UE_B 330 in the EPC network as a relay UE while receiving the search message for finding a relay UE, by registering the UE_B 330 in the EPC network as a relay UE while sending a response message to the search message, or by registering the UE_B 330 in the EPC network as a relay UE at all times, in a process of performing direct discovery.

A scheme is described in which, when a UE is outside of the E-UTRAN coverage, the UE discovers a UE outside of the E-UTRAN coverage to which the UE is in proximity, using the direct discovery (model A).

Figure 4:
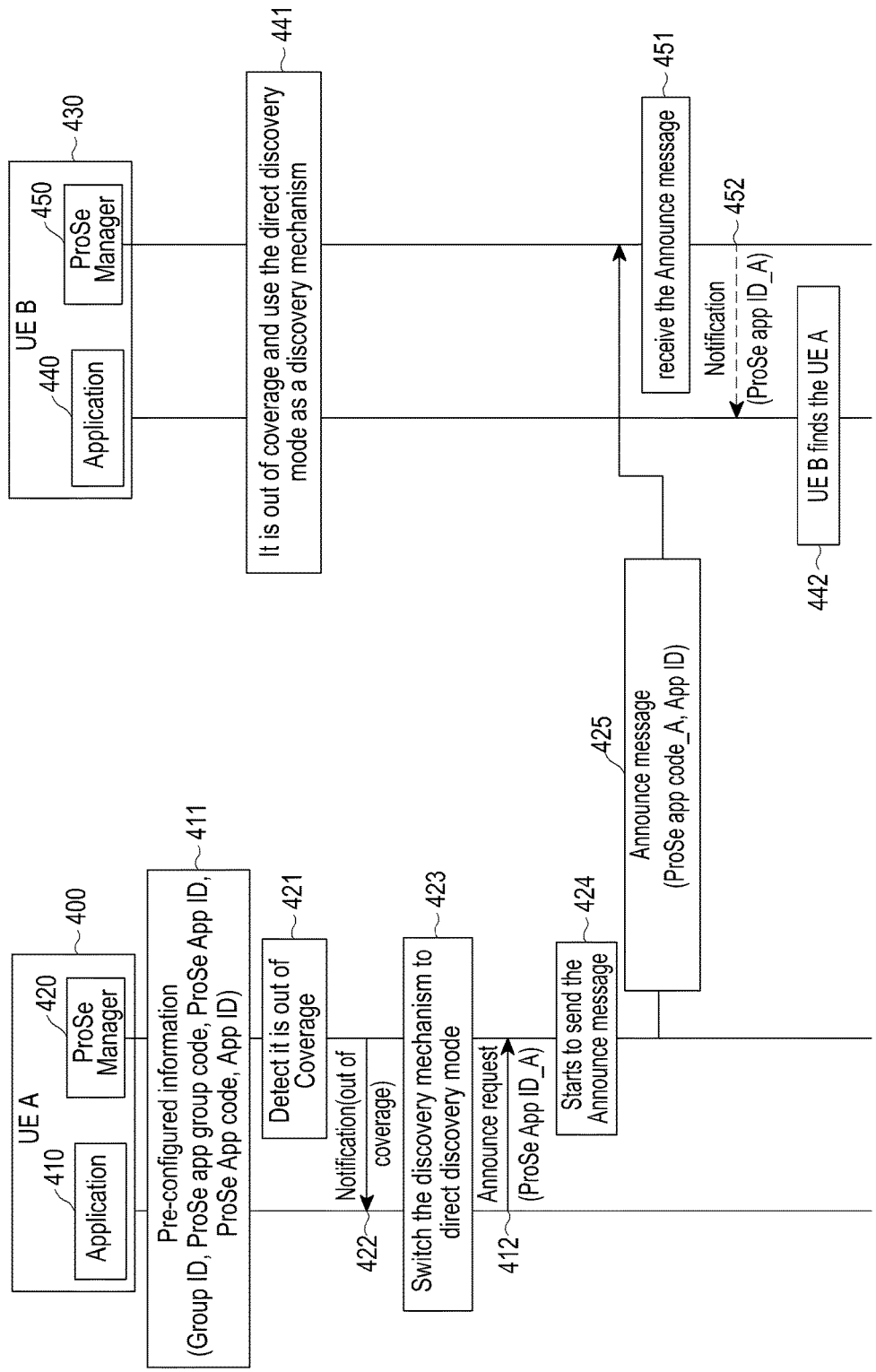
FIG. 4 is a flowchart of another discovery procedure according to an embodiment of the present disclosure.

FIG. 4 is a flowchart of another discovery procedure according to an embodiment of the present disclosure.

Referring to FIG. 4, since operations 411, 421, 422 and 423 in an embodiment of FIG. 4 are substantially similar to operations 211, 221, 222 and 223 in FIG. 2, a detailed description thereof will be omitted. In FIG. 4, UEs 400 and 430 are assumed to operate according to model A in the direct discovery scheme.

If an application 410 of the UE_A 400 sends an announce request including a ProSe application ID_A of the UE_A 400 to a ProSe manager 420 in operation 412, or the manager 420 sends an announce request, the manager 420 may transmit (or broadcast, announce) an announce message including a ProSe application code_A corresponding to the ProSe application ID_A in operations 424 and 425. The ProSe application ID_A may be understood as information about an announcer UE that transmits (or broadcasts, announces) the announce message, since the ProSe application ID_A is information about the UE_A 400. As described above, D2D communication may be used in public safety services such as fire and police. For example, in a case where firefighters perform D2D communication, the ProSe application ID_A may be information about an announcer UE that transmits (or broadcasts, announces) the announce message to the group of adjacent firefighters.

The announce message may include at least one of an application ID, a group ID_1 of a group to which the UE_A belongs, and a ProSe application group code_1 corresponding to the group ID_1, in addition to the ProSe application code_A. Further, in the public safety service given as an example of the fire service, the ProSe application group code_1 may be a service code indicating a fire-related relay.

In operation 441, it is assumed that the UE_B 430, like the UE_A 400, is operating in the direct discovery mode by performing operations 411, 421, 422 and 423. If the UE_B 430 receives the announce message in operation 451, a ProSe manager 450 of the UE_B 430 may send, to an application 440, a notification message including a ProSe application ID_A or a group ID_1, which indicates the reception of the announce message from the UE_A 400 or a member of the group with group ID_1, thereby notifying the application 440 that the UE_A or a member of the group with group ID_1 is in proximity to the UE_B 430, in operations 452 and 442.

A scheme is described in which when a UE is outside of the E-UTRAN coverage, the UE discovers a relay UE to which the UE is in proximity, using the direct discovery (model A).

Figure 5A:
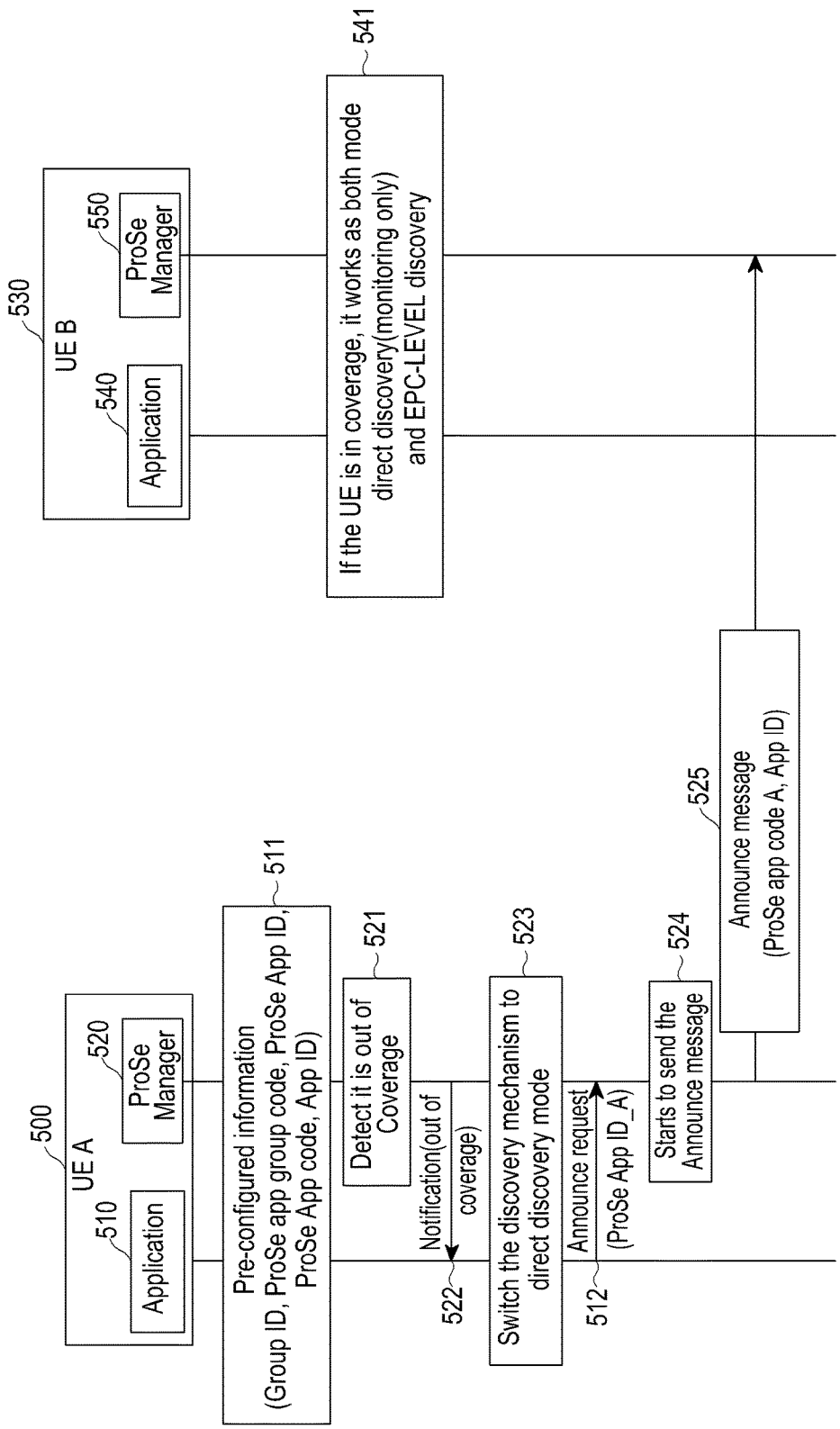
FIGS. 5A and 5B are flowcharts of another discovery procedure according to an embodiment of the present disclosure.
Figure 5B:
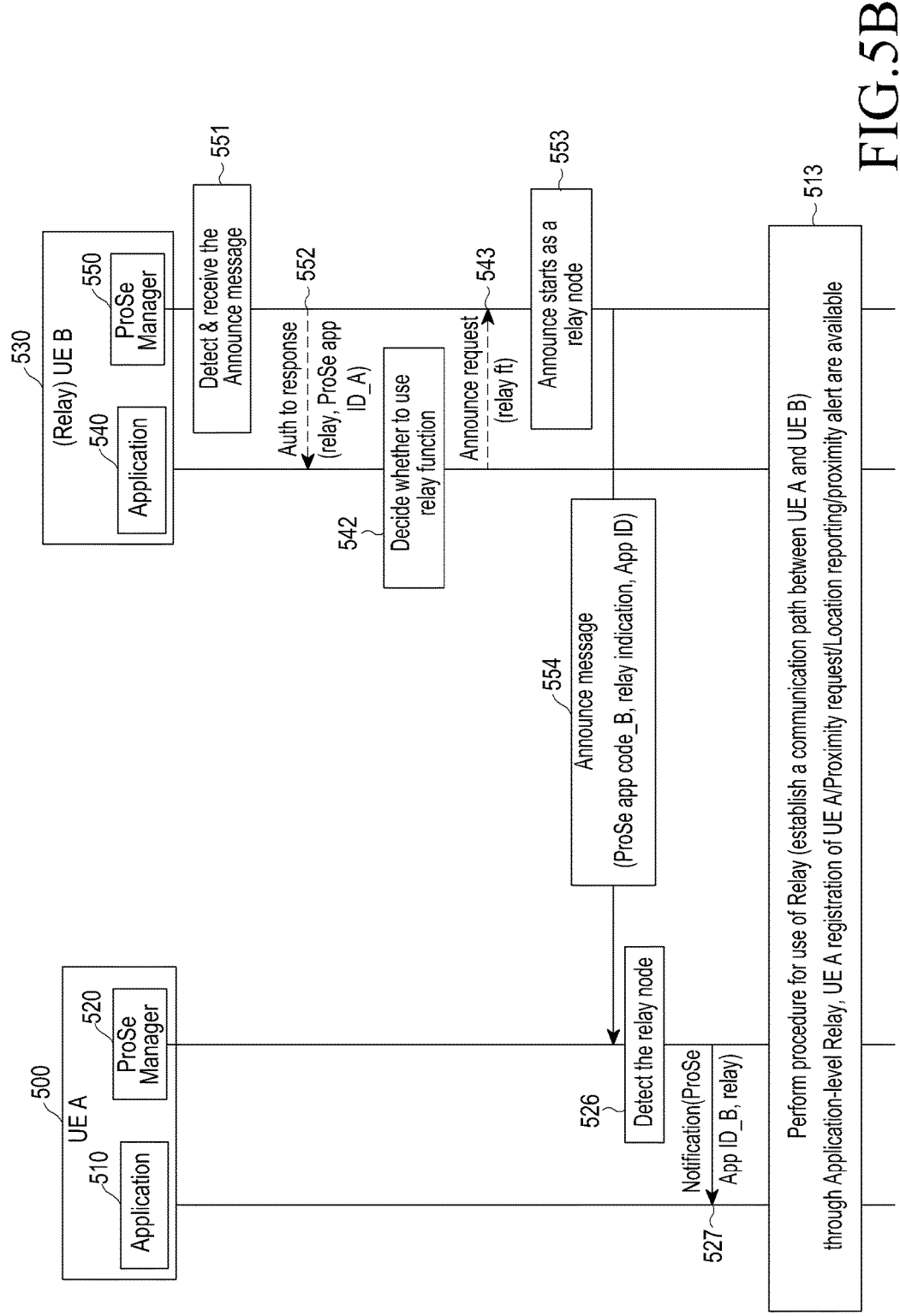

FIGS. 5A and 5B are flowcharts of another discovery procedure according to an embodiment of the present disclosure.

Referring to FIGS. 5A and 5B, a UE_A 500 may include a ProSe application 510 and a ProSe manager 520 that is responsible for a discovery-related function in the EPC network. A UE_B 530 adjacent to the UE_A 500 may also include a ProSe application 540 and a ProSe manager 550 that is responsible for the discovery-related function in the EPC network. In this embodiment, it is assumed that the UE_A 500 and the UE_B 530 are UEs located outside of the E-UTRAN coverage, and the UE_B 530 is a UE capable of performing a relay function.

In operation 511, the UE_A 500 includes information to perform direct discovery outside of the E-UTRAN coverage. The information may be stored in the UE_A 500, or may be provided from the network or through various paths when the UE_A 500 is in the E-UTRAN coverage. The pre information may include at least one of, for example, group members of a group to which the UE_A 500 belongs, a ProSe application ID (or an application layer user ID) used by the UE_A 500, a ProSe application code corresponding to the ProSe application ID, an Application ID identifying an application associated with a corresponding service (for example, a service for public safety), a group ID for identifying a group to which the UE_A 500 belongs, a ProSe application group code corresponding to the group, and a ProSe application code_relay indicating a relay UE. If a value of the ProSe application code, the ProSe application group code or the ProSe application code_relay is changed periodically or aperiodically, the UE may store a codebook or a parameter for generating the codes, and continuously update the code values depending on the situation.

Upon recognizing in operation 521 that the UE_A 500 is outside of the E-UTRAN coverage, the manager 520 may notify the application 510 that the UE_A 500 has moved outside of the E-UTRAN coverage, in operation 522. A way to determine that the UE_A 500 is outside of the coverage is to allow a modem (not shown) of the UE_A 500 to notify the manager 520 that there is no E-UTRAN cell on which the UE_A 500 can camp, or notify the application 510 through direct notification.

Upon recognizing that the UE_A 500 is outside of the E-UTRAN coverage, the manager 520 or the application 510 may switch the discovery method to the direct discovery mode in operation 523. Operation 523 may be optionally performed.

Further, in a case where the application 510 of the UE_A 500 sends an announce request to the manager 520 in operation 512, or in a case where the application 510 is set to send an announce request as the UE_A 500 goes outside of the E-UTRAN coverage, the manager 520 may broadcast (or announce) the announce message including a ProSe application code_A assigned thereto, in operations 524 and 525 in FIG. 5A.

The announce message may include at least one of an application ID, a group ID_1, and a ProSe application group code_1 in addition to the ProSe application code_A.

In operation 541, if the UE_B 530 with a relay function is in the E-UTRAN coverage, the UE_B 530 may operate in the EPC-level discovery mode, and may also operate in the direct discovery mode to perform the relay function. However, the UE_B 530 may perform only monitoring without performing announcement in the direct discovery mode.

If the UE_B 530 receives or detects the announce message in operation 551, the manager 550 may ask the application 540 to operate as a relay UE in operation 552, or may ask the ProSe function in the EPC network whether the UE_A 500 is a UE for which the UE_B 530 is allowed to perform relay.

The manager 550 may start sending an announce message as a relay node in operation 553 when the UE_B 530 is not restricted by the ProSe function 500, when the manager 550 is permitted by the application 540 to play a role of a relay UE for the UE_A 500 through operations 542 and 543, when the manager 550 is set, through a preset, or is determined to relay for the UE, or when the manager 550 is set, through a preset, or is determined to relay for the group with group ID_1 to which the UE_A 500 belongs.

The announce message announced by the UE_B 500 may include at least one of a ProSe application code_B of a code for the UE_B 530, a relay indication indicating the presence of the relay function, a ProSe application code_relay that is a code indicating a relay UE, and an application ID.

In operation 554, the announce message is transmitted by the UE_B 530. In operations 526 and 527, the manager 520 may recognize that a relay UE is in proximity to the UE_A 500, and notify it to the application 510 to notify that the UE_B 530 with a relay function is in proximity to the UE_A 500, thereby notifying that it is possible to perform EPC level discovery.

On the other hand, if the UE_B 530 has not received a relay request from any adjacent UE for a predetermined time since operation 553, or if there is no UE using a relay function, the UE_B 530 may perform only monitoring in the direct discovery mode.

Upon receiving the announce message announced by the UE_B 500 in operations 526 and 527, the UE_A 500 may establish a ProSe communication path to the UE_B 530 or a relay UE, and perform EPC-level discovery through the communication path, in operation 513.

The UE_B 530 may prepare or perform the relay function, without actually perform the relay function, by registering the UE_B 530 in the EPC network as a relay UE while determining that the UE_B 530 can operate as a relay UE after receiving the announce message, by registering the UE_B 530 in the EPC network as a relay UE while sending an announce message indicating the presence of the relay function, or by registering the UE_B 530 in the EPC network as a relay UE at all times, in a process of performing direct discovery.

The setting of the discovery mode operated by the UE, and the relay UEs may be effectively used for discovery, making it possible to reduce the power consumption of the UE, or reduce the occupancy of the wireless channel for D2D.

Next, a description will be made of a scheme for a relay service in D2D communication according to an embodiment of the present disclosure.

An embodiment of the present disclosure provides a method in which a remote UE outside of coverage of a mobile communication service finds a relay UE to use a relay function in the public safety situation, a method in which a relay UE establishes a PDN connection for providing a relay, and a method in which the relay UE and the remote UE exchange control information during the relay, in using a D2D service or a ProSe in which adjacent UEs may directly discover each other.

The relay UE should be differentiated in terms of the billing method, since the relay UE uses mobile communication resources for as a public safety network, when providing the relay function for public safety. Further, a relay-dedicated PDN connection is required since the D2D service may be differentiated from other services in terms of the quality of service (QoS). However, currently, in the mobile communication system, there is no way to establish a PDN connection for a relay.

Further, a remote UE may use a D2D direct discovery (or ProSe direct discovery) service to find a relay UE, and in a current ProSe direct discovery system, a procedure for direct message exchange between UEs is not provided. Therefore, the ProSe direct discovery system requires a procedure in which one UE continuously announces its information, another UE receives (or monitors) the information and analyzes the received information, determines that it is in proximity thereto, and directly exchanges messages with UEs. In other words, if a remote UE and a relay UE discover each other using the existing discovery method, the remote UE and the relay UE can determine that they are in proximity thereto, but may not exchange messages with each other. In other words, in the existing discovery method, if a remote UE announces its presence, a relay UE that monitors the announce message may merely know that a remote UE is in proximity thereto, but may not perform other operations. Even in the opposite case, similarly, if a relay UE announces its presence, a remote UE that monitors the announce message may determine that a relay UE is in proximity thereto, but may not exchange information for connecting with the relay UE by directly sending a message. Therefore, an information exchange method for a relay connection between a remote UE and a relay UE using the direct discovery method currently supported by the mobile communication system is required.

Further, a remote UE and a relay UE may stop the relay functions depending on the determination of each user. In order to prevent the resources for the relay from being unnecessarily occupied, a method for stopping the relay function between the remote UE and the relay UE is required. In addition, for the relay UE, the situation of the UE may change while the relay UE provides the relay function. For example, the overall relay service quality drops as a plurality of remote UEs are connected, or the available capacity of a data transfer rate (or bitrate) for a packet network connection assigned from the network is insufficient, or the battery of the relay UE is diminished, and an unstable communication continues during a low electric field because a high quality signal is not received from the eNB. There is a need to inform the remote UE of this situation so that the remote UE may find another stable relay UE.

In accordance with a method and apparatus for supporting the ProSe function 121 for D2D service control and the relay function for the public safety of a UE desiring to use the D2D service in the D2D system according to an embodiment of the present disclosure, a UE supporting the relay function may establish a relay-dedicated packet network connection using the existing mobile communication network procedure, and exchange relay connection information with a UE outside of the network coverage using a direct discovery function. Further, the UE may cancel the relay resources during the relay function, or may provide a reliably relay service by exchanging control information about the relay state.

In an embodiment of the present disclosure, the relay function for the public safety may be provided through a remote UE outside of the network coverage and a relay UE providing the relay function to the remote UE. The remote UE and the relay UE may discover each other using the ProSe open discovery scheme. In this case, the remote UE may be an announcing UE and the relay UE may be a monitoring UE, and on the contrary, the relay UE may be an announcing UE and the remote UE may be a monitoring UE. Since the remote UE cannot obtain a ProSe application code or a discovery filter from the ProSe function, the remote UE may be provided with ProSe-related information for public safety in advance when the remote UE is in the network coverage, or may use the ProSe-related information for the public safety, which is stored in advance in the remote UE, and the ProSe-related information for the public safety, which is stored in advance, may be defined by the mobile operators, countries or international organizations. The relay UE may establish a packet network connection (hereinafter, referred to as a PDN connection) for the relay function, and transmit relay data only via the packet network connection, for controlling the billing for the packet that is relayed in the network and providing a specific quality of service.

Figure 6:
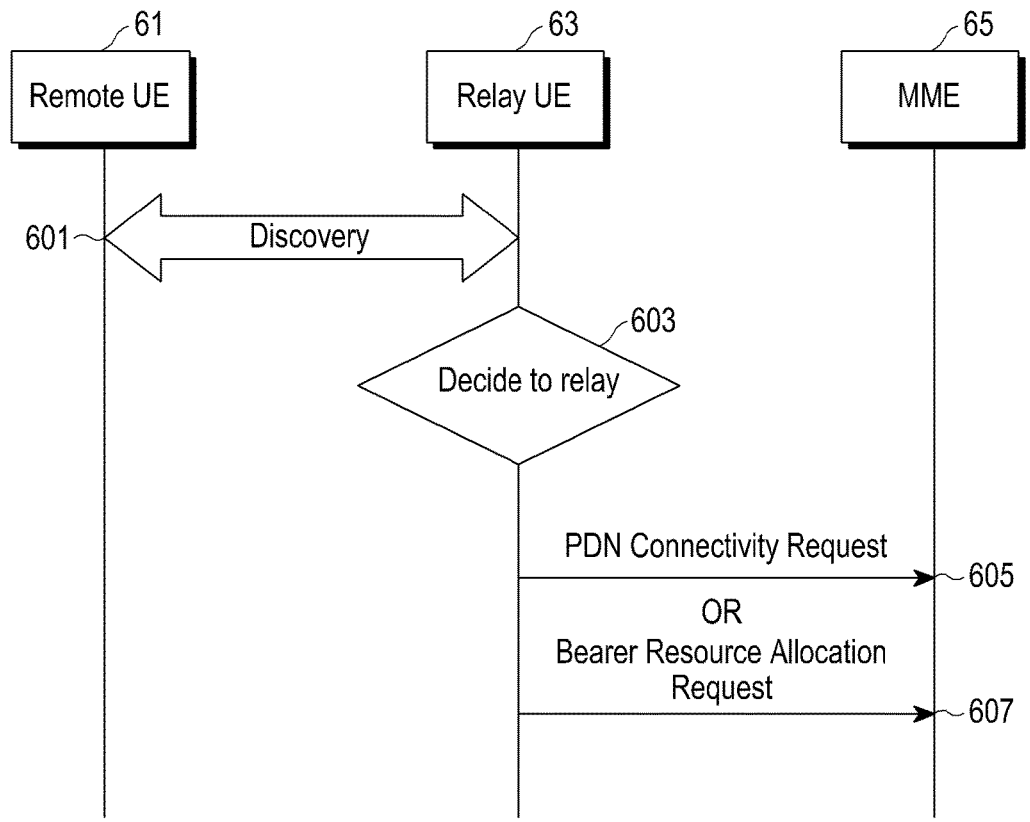
FIG. 6 is a flowchart of a method for establishing a packet data network (PDN) connection for Relay or a bearer for Relay according to an embodiment of the present disclosure.

FIG. 6 is a flowchart of a method for establishing a PDN connection for Relay or a bearer for Relay according to an embodiment of the present disclosure, and an embodiment of FIG. 6 shows a procedure for transmitting a message for session establishment to the network to establish a PDN connection for Relay by a remote UE.

Referring to FIG. 6, in operation 601, a relay UE 63 may discover the presence of a remote UE 61 through a discovery operation. In operation 603, the relay UE 63 may determine whether to perform a relay operation. In the operation 603, the relay UE 63 may determine whether to perform the relay operation by receiving a remote UE's message indicating a need for relay, or the relay UE 63 may determine in advance to perform relay on its own. In this case, the relay UE 63 may determine in advance to perform relay without the discovery operation performed in operation 601. After determining to perform relay in operation 603, the relay UE 63 may send a message for session establishment to a MME 65 of the mobile communication network in operation 605 or 607 to establish a PDN connection for the remote UE 61.

The PDN connectivity request message in operation 605 may be a message by which the relay UE 63 requests a PDN connection for relay function for the remote UE 61 when there is no PDN connection connected to the network, or may be a message by which the relay UE 63 requests establishment of a PDN connection for Relay, if there is no PDN connection for Relay even though there is an already connected PDN connection. The PDN connectivity request message may include information such as access point name (APN), PDN Type, Protocol Configuration Options and Request Type according to the current 3GPP mobile communication standard. The relay UE 63, when transmitting the PDN connectivity request message, may include therein an identifier indicating that the relay UE 63 requests a PDN connection for Relay. To this end, two methods may be used. A first method sets an APN for relay during the transmission. For the relay APN, a UE may follow a preset value, or receive a value provided from the network. If the relay UE 63 transmits a PDN connection request including the relay APN to the MME 65, the MME 65 may determine, based on the relay APN, that the PDN connection request is for relay functions. Accordingly, the MME 65 may assign a PDN connection for Relay to the relay UE 63. A second method expressly indicates relay functions in an information field of a Request Type. The Request Type, as defined in the current 3GPP standard, may indicate whether request for PDN connection is for initial attach, handover, or emergency. The Request Type may be composed of 3 bits, and assigned from 001 to 100. By additionally assigning a bit value (e.g., a bit value of 101 or 111) indicating Relay to the Request Type, it is possible to indicate that the Request Type is for requesting a PDN connection for Relay. The bit value indicating relay may indicate public safety services based on ProSe, or indicate Relay used in the mobile communication system. The relay UE 63, when transmitting the PDN connectivity request message, may set a bit value indicating Relay in an information field of the Request Type, and the MME 65 may check the Request Type of the message and determine that the PDN connection requested by the relay UE 63 is for the purpose of Relay. Accordingly, the MME 65 may assign a PDN connection for Relay to the relay UE 63.

In order to establish a PDN connection for relay functions, the relay UE 63 may send a bearer resource allocation request message in operation 607. The bearer resource allocation request message may be a request message by which a UE is to be allocated a bearer satisfying specific QoS by requesting it from the network when the UE wants the specific QoS. Generally, upon receiving the bearer resource allocation request message, the network may allocate a new dedicated bearer to the UE that has requested this message, or may reallocate a bearer by changing the information allocated to the existing bearer. Upon determining to perform the relay function in operation 603, the relay UE 63 may request a bearer for Relay in operation 607, instead of requesting a PDN connection for relay functions in operation 605. The bearer resource allocation request message is a message based on the current mobile communication standard, and this message may include an information field of a required traffic flow QoS indicating QoS requested by the UE. The information field of the required traffic flow QoS may include an identifier (hereinafter, referred to as a QoS class identifier (QCI)) indicating a specific QoS. When transmitting the bearer resource allocation request message to the MME 65 in operation 607, the relay UE 63 may include or insert a QCI value for Relay in a QCI value of the required traffic flow QoS in order to determine whether the bearer requested by the relay UE 63 is a bearer for relay functions. The mobile operator may set in advance a QCI value for relay functions, and the MME 65 may determine that the requested bearer is for relay functions by checking the preset QCI value. Therefore, when transmitting the bearer resource allocation request message in operation 607, the relay UE 63 may include or insert a QCI value indicating Relay in an information field of Required traffic flow QoS, so the MME 65 may allocate a dedicated bearer used for Relay to the relay UE 63, or reallocate the existing bearer so that it may be used for Relay.

Figure 7A:
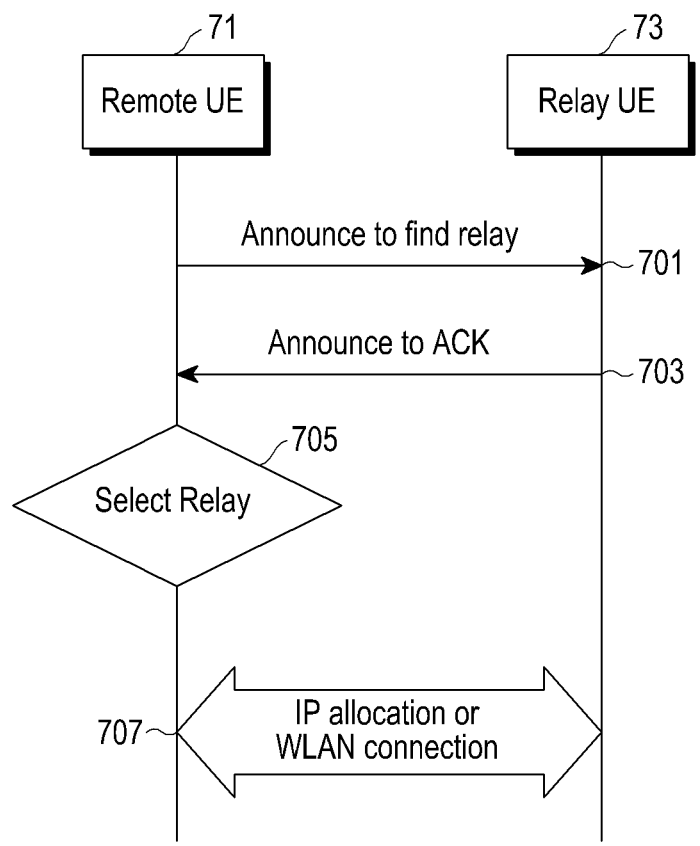
FIGS. 7A and 7B are flowcharts of a method for establishing a relay connection according to an embodiment of the present disclosure.
Figure 7B:
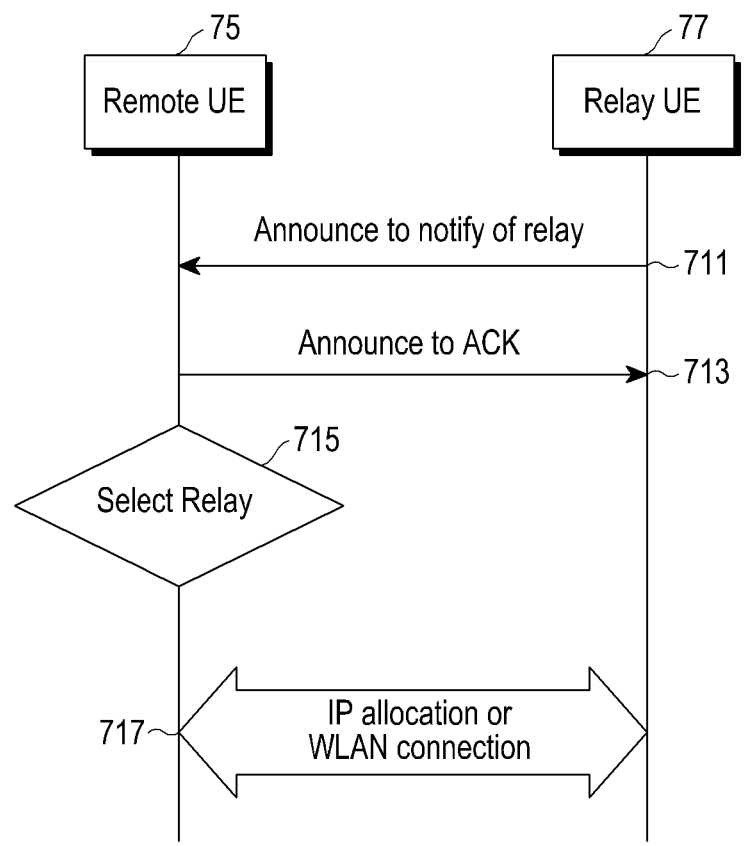

FIGS. 7A and 7B are flowcharts of a method for establishing a relay connection according to an embodiment of the present disclosure in which a remote UE and a relay UE discover each other and establish a connection.

Since a remote UE and a relay UE discover each other using the ProSe open discovery method, the remote UE and the relay UE may not directly transmit messages to each other. Therefore, another embodiment of the present disclosure allows the remote UE and the relay UE to discover and exchange connection information with each other, each UE may transmit and receive messages by alternately performing announcing and monitoring.

Referring to FIG. 7A, a remote UE 71 first performs announcing.

Referring to FIG. 7A, in operation 701, the remote UE 71 may send a message including at least one of its own network layer 2 ID and information for identifying a need for relay functions though announcing. For the information for identifying a need for Relay, for example, a ProSe application code used to find a relay UE may be used. For the ProSe application code, it may be provided in advance by the network or a value previously stored in a UE may be used, and this may follow the provisions of the mobile operators, countries or international organizations. When the remote UE 71 is performing announcing in operation 701, a relay UE 73 may perform monitoring until the relay UE 73 receives an announcing message from the remote UE 71. The relay UE 73 may have a discovery filter capable of distinguishing a ProSe application code indicating the need for relay functions, and may perform a monitoring operation using the discovery filter. For the discovery filter, it may be provided in advance by the network or it may follow a value previously stored in a UE, and this may follow the provisions of the mobile operators, countries or international organizations. Upon receiving the announce message from the remote UE 71 in accordance with the announcing in operation 701, the relay UE 73 may switch to the announcing mode, and then send a message including at least one of a network layer 2 ID of the relay layer 73 and information for identifying execution of relay functions in operation 703. For the information for identifying execution of relay functions, for example, a ProSe application code used to support relay functions may be used. For the ProSe application code, it may be provided in advance by the network or a value previously stored in a UE may be used, and this may follow the provisions of the mobile operators, countries or international organizations. In operations 701 and 703, since the ProSe application code is information for identifying (or finding) a relay UE in D2D communication, the ProSe application code may be used as, for example, a relay-related service code indicating a relay associated with the public safety. Further, the relay UE 73 may send a message including information capable of indicating its own relay state in addition to the information for identifying execution of Relay. The information capable of indicating a relay state may indicate a network connection status and a battery status of the relay UE 73, and a detailed procedure for releasing the relay connection using this information will be described later. After sending the message including information for identifying the need for Relay for a predetermined time in operation 701, the remote UE 71 may switch to the monitoring mode. The remote UE 71 may have a discovery filter capable of distinguishing a ProSe application code for identifying execution of relay function, and may perform a monitoring operation using the discovery filter. For the discovery filter, it may be provided in advance by the network or it may follow a value previously stored in a UE, and this may follow the provisions of the mobile operators, countries or international organizations. Upon receiving the message sent by the relay UE 73 in operation 703, the remote UE 71 may select, in operation 705, one relay UE 73 among a plurality of relay UEs that have sent the message, in a case where the remote UE 71 has received messages from the plurality of relay UEs in operation 703. Further, upon receiving the message from one relay UE 73 in operation 703, the remote UE 71 may select the relay UE 73. Thereafter, in operation 707, the remote UE 71 and the relay UE 73 may perform an operation for IP allocation of the remote UE 73, or exchange information for a wireless local area network (WLAN) direct connection.

Referring to FIG. 7B, the roles of the remote UE and the relay are reverse.

In operation 711, a relay UE 77 may first announce a message including information (e.g., a ProSe application code) for identifying its execution of a relay operation. Thereafter, operations 713, 715 and 717 are the same as corresponding operations 703, 705 and 707 except for the reverse of the roles of the remote UE and the relay UE, which are described in the embodiment of FIG. 7A. The ProSe application code described in the procedures of FIGS. 7A and 7B does not necessarily mean the form of a code, and may obviously mean the identification information defined to be used for the purpose of the public safety. For example, the identification information may include a ProSe application ID for the public safety, a ProSe group ID, and a ProSe UE ID for performing Relay.

Figure 8A:
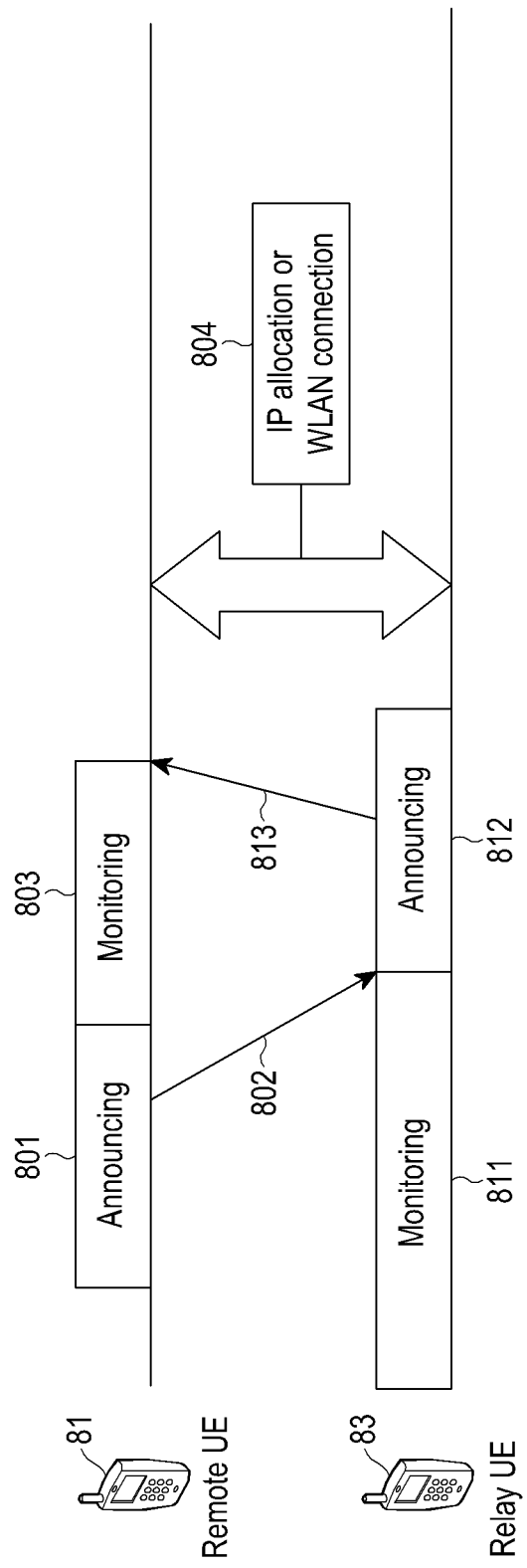
FIGS. 8A and 8B are flowcharts of a method for repeating announcing and monitoring to establish a relay connection according to an embodiment of the present disclosure.
Figure 8B:
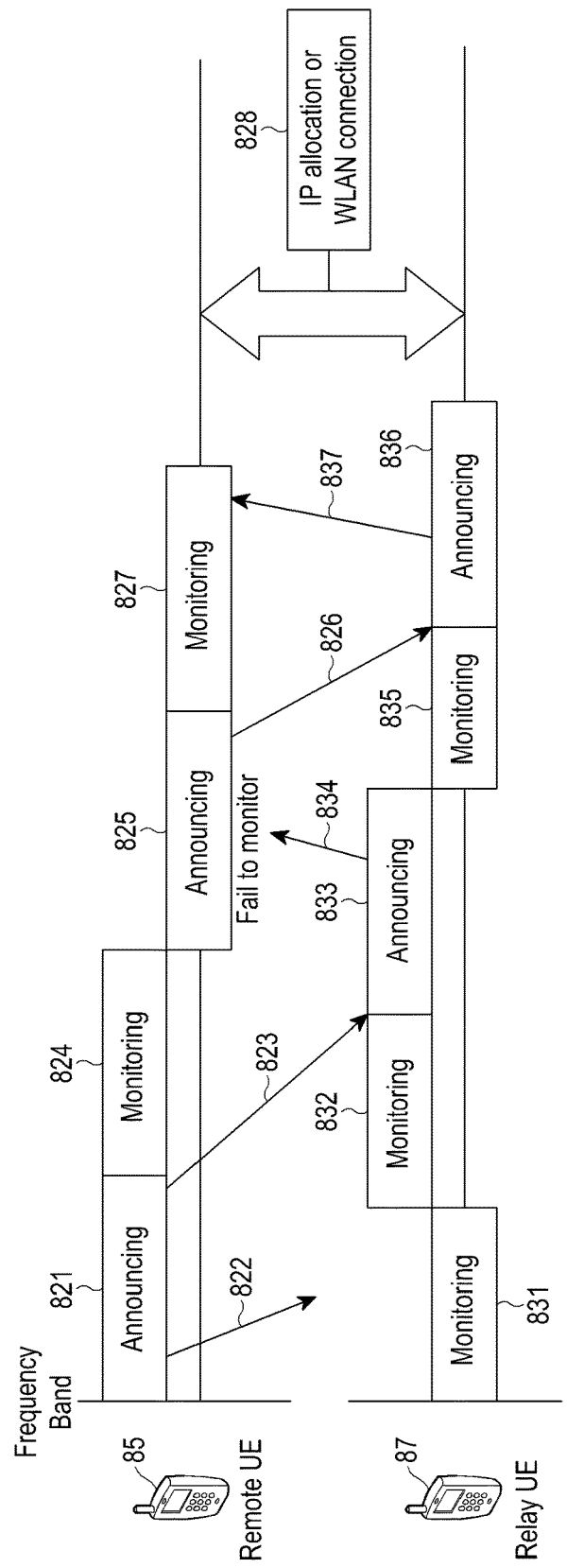

FIGS. 8A and 8B are flowcharts of a method for repeating announcing and monitoring to establish a relay connection according to an embodiment of the present disclosure.

Referring to FIGS. 8A and 8B, a remote UE and a relay UE discover each other and establish a relay connection while alternately performing announcing and monitoring at a specific time interval. The time interval (or a timer interval) at which announcing and monitoring can be alternately performed, may be set in advance for the remote UE. As for the time interval information, the remote UE may receive the time interval information provided from the ProSe function when performing service authorization for ProSe, may use the default value stored in the UE, or may use a value that the UE determined. If the value that the UE has determined on its own is used, the UE may set the time interval value by determining the degree of congestion of the D2D channel by monitoring the D2D channel for a predetermined time. Further, the remote UE may transmit the time interval information using an announcing message, and upon receiving this message, the relay UE may set the time interval at which the relay UE can alternately perform announcing and monitoring based on the received time interval information. In addition, the relay UE may also use the value that is received from the ProSe function during service authorization, may use the default value stored therein, or may use a value that the remote UE determined. If the value that the UE has determined on its own is used, the UE may set the time interval value on its own by determining the degree of congestion of the D2D channel through monitoring for a predetermined time.

FIGS. 8A and 8B will be described such that the direct discovery procedure of FIG. 2A is implemented. A case where the embodiment of FIGS. 8A and 8B is applied to an embodiment of FIG. 2B is the same as the case where the embodiment of FIGS. 8A and 8B is applied to an embodiment of FIG. 2A, except for the reverse of the message delivery direction and the order of announcing and monitoring. If the relay UE receives an announcing message from the remote UE while performing monitoring, the relay UE may switch to the announcing mode, and follow the time interval set by the above method. Referring to FIG. 8A, in operation 801, a remote UE 81 may start announcing an announcing message requesting a relay. A relay UE 83 may monitor in operation 811 until the announcing message from the remote UE 81 arrives and the relay UE 83 may receive the announcing message sent by the remote UE 81 as a result of the announcing in operation 801 as shown by reference numeral at operation 802. Upon receiving and recognizing the message announced by the remote UE through the preset discovery filter, the relay UE 83 may switch to the announcing mode, and start an announcing operation indicating that the UE itself is a relay UE, in operation 812. The remote UE 81 that has performed announcing for a predetermined time interval in operation 801 may switch to the monitoring mode in operation 803 after a lapse of the time. The announcing mode and the monitoring mode may be equal to or different from each other in terms of the time interval. The remote UE 81, in operation 813, may receive the announcing message from the relay UE 83 that performs an operation of notifying Relay in operation 812. The remote UE 81 may recognize, through a preset discovery filter, that the message received in operation 813 is a message announced by a relay UE. The remote UE 81 may directly send a message to the relay UE 83 using the information (e.g., a layer 2 ID for identifying a relay UE, such as a network layer 2 ID address or a ProSe UE ID of a relay UE) that is received in operation 813, and may start information exchange for IP allocation or WLAN direct connection with the relay UE 83, in operation 804. After performing the announcing operation for the set time interval, the relay UE 83 may receive the information about the IP allocation or WLAN direct connection, which is sent by the remote UE 81, and perform the IP allocation or WLAN direct connection.

Referring to FIG. 8B, a remote UE 85 and a relay UE 87 may discover each other by switching between announcing and monitoring while changing the frequency band step, in addition to switching between announcing and monitoring at a predetermined time interval.

Referring to FIG. 8B, in operations 821 and 824, the remote UE 85 may use an upper band among the bands allowed to use ProSe, and in operations 825 and 827, the remote UE 85 may use a middle band which is lower than the band used in operations 821 and 824. The frequency band used in a public safety situation may be provided in a ProSe service authorization process, and a frequency step by which the frequency can hop for announcing or monitoring may also be provided together. A UE that has received the above information, when it has started a public safety operation outside the network coverage, may perform frequency hopping from a start frequency band to an end frequency band according to the set frequency step, may follow the predetermined order, and may perform announcing or monitoring at a given time interval or for a time interval that the UE determined. More specifically, the remote UE 85 may start announcing in operation 821 starting at the start frequency band among the authorized frequency bands. Since the relay UE 87 is performing monitoring in the middle frequency band in operation 831 through the start frequency band among the authorized frequency bands, the relay UE 87 may not receive a message 822 sent by the remote UE 85. The remote UE 85 may continuously perform announcing of operation 821 for a predetermined time interval, and after a lapse of the time interval, the remote UE 85 may perform monitoring of operation 824 in the band where the remote UE 85 has performed announcing. When performing the monitoring of operation 824, the remote UE 85 may hop to the frequency band in which the remote UE 85 is likely to discover a UE, and perform monitoring in the frequency band. However, the remote UE 85 is assumed to perform the monitoring operation in the same frequency band. The relay UE 87 may perform monitoring of operation 831 for a predetermined time, and if there is no monitored announcing message, the relay UE 87 may hop to another frequency band, and keep monitoring in the other frequency band. Since the relay UE 87 follows the operation in FIG. 2A, the relay UE 87 may continuously perform monitoring until the relay UE 87 receives the announcing message from the remote UE 85. As for the announcing message that the remote UE 85 has sent in operation 821, the relay UE 87 may monitor the announcing message as shown in operation 823, and if the relay UE 87 knows that the announcing message from the remote UE 85 and for finding a relay UE, using a discovery filter, then the relay UE 87 may switch to the announcing mode in operation 833. In operation 833, the announcing may be performed in the frequency band where the relay UE 87 has received the announcing message sent by the remote UE 85, or under the expectation that the remote UE 85 will hop to the next band and perform monitoring in the band, the relay UE 87 may hop to the next band and perform announcing in operation 833. The relay UE 87 is assumed to perform the announcing in operation 833 in the band where the relay UE 87 has received the message 823. Since the announcing in operation 833 is performed in the band where the relay UE 87 has received the message 823, the remote UE 85 performs monitoring in operation 824 for a predetermined time and then hops to the middle band and performs announcing in the middle band in operation 825, may not monitor a message 834. The remote UE 85 that has performed the monitoring in operation 824 may perform announcing in operation 825 for a predetermined time interval, and then switch to the monitoring mode in operation 827. The relay UE 87 that has performed the announcing in operation 833 for a predetermined time, may hop to the next frequency band and perform monitoring in the frequency band in operation 835, and if the relay UE 87 receives a message in operation 826 and determines through the discovery filter that the announcing message is for finding a relay UE, the relay UE 87 may perform announcing in the hoped frequency band in operation 836. Like the announcing operation in operation 833, the announcing operation in operation 836 may also be performed in the frequency band where the relay UE 87 received a message in the previous monitoring operation. The remote UE 85, which received a message in operation 837 while monitoring in operation 827, may determine through the discovery filter that the received message is an announcing message sent by the relay UE 87, and then perform an operation for IP allocation or WLAN connection in operation 828, thereby completing the relay connection.

Figure 9A:
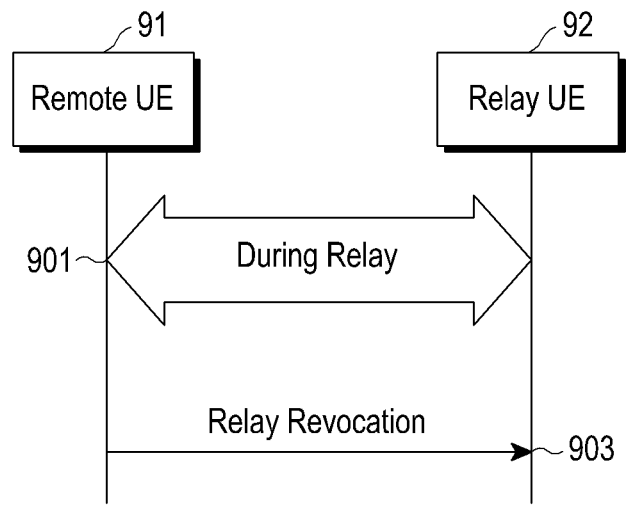
FIGS. 9A, 9B, and 9C are flowcharts of methods for releasing a relay connection according to an embodiment of the present disclosure.
Figure 9B:
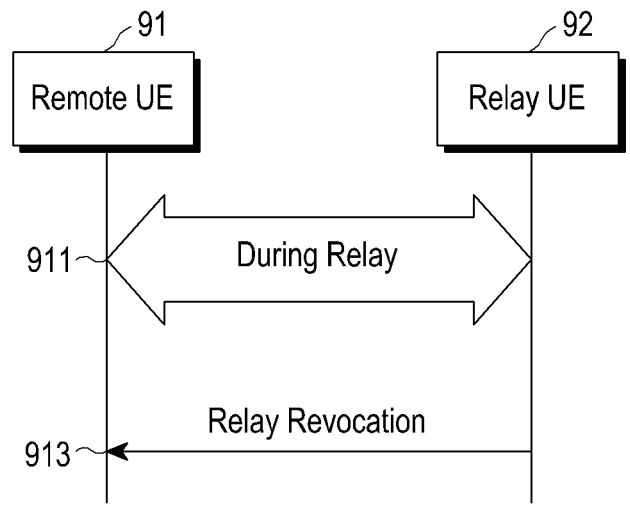
Figure 9C:
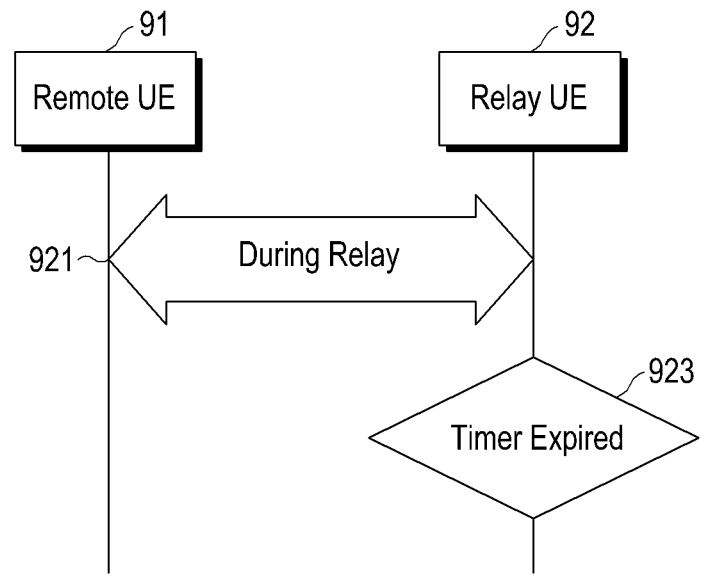

FIGS. 9A, 9B, and 9C are flowcharts of methods for releasing a relay connection according to an embodiment of the present disclosure.

Referring to FIGS. 9A, 9B, and 9C, a remote UE 91 and a relay UE 92 release the relay connection.

Referring to FIG. 9A, the remote UE 91 initiates relay revocation or relay release. In operation 901, the remote UE 91 and the relay UE 92 are performing a relay operation. The remote UE 91 may determine not to use the relay UE 92 for relay operations. In this case, the remote UE 91 may start the relay revocation procedure if the battery of the remote UE 91 remains insufficient, if the remote UE 91 enters again the coverage provided by the network, if the remote UE 91 finds another relay UE and changes the connection to the relay UE, or according to the determination of the remote UE 91. Upon determining to stop relay functions, the remote UE 91 may notify the revocation of the relay operation by transmitting a message for the relay revocation or relay release to the relay UE 92 in operation 903.

Referring to FIG. 9B, the relay UE 92 initiates relay revocation or relay release. In operation 911, the remote UE 91 and the relay UE 92 establish a relay connection, and then are performing a relay operation. The relay UE 92 may determine not to provide relay operations. In this case, the relay UE 92 may start the relay revocation procedure, if the battery of the relay UE 92 remains insufficient, if the relay UE 92 has lost its connection to the network, if the relay UE 92 has received signaling from the network as the relay UE 92 is not allowed to perform relay functions any longer, or according to the determination of the relay UE 92. Upon determining to stop relay functions, the relay UE 92 may notify the revocation of the relay operation by transmitting a message for the relay revocation or relay release to the remote UE 91 in operation 913.

Referring to FIG. 9C, a procedure is illustrated for determining whether to stop the relay operation through a timer for transmission of a relay packet transmitted between the remote UE 91 and the relay UE 92. In operation 921, the remote UE 91 and the relay UE 92 establish a relay connection, and then are performing a relay operation. Thereafter, in operation 923, in a case where a relay transmission packet has not arrived from the remote UE 91 for a predetermined time and a timer, which started since the packet did not arrive, has expired as a predetermined time has elapsed, the relay UE 92 that has determined that the relay was stopped may stop the relay operation on its own. The timer may be a value that is specified as a default value in the relay UE 92, may be a value that the relay UE 92 has determined, a value that the relay UE 92 has received from the ProSe function when the relay UE 92 undergoes service authorization, and may be a value that the relay UE 92 received in case that there is no packet transmission from the network through a PDN connection for Relay for a predetermined time.

In a case where the relay revocation or relay release has occurred through the operations in the embodiment of FIGS. 9A to 9C, the relay UE 92 may notify the network that the relay is finished.

Figure 9D:
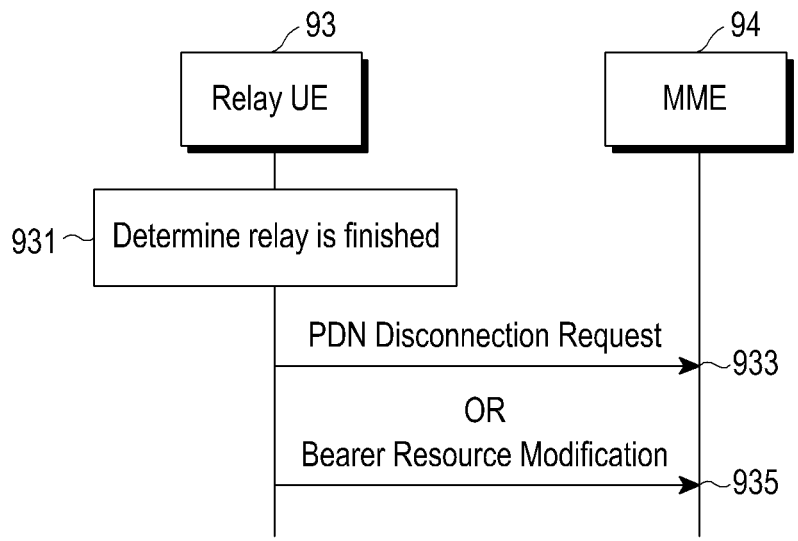
FIG. 9D is a flowchart of a method for releasing a PDN connection according to an embodiment of the present disclosure.

FIG. 9D is a flowchart of a method for releasing a PDN connection for Relay according to an embodiment of the present disclosure.

Referring to FIG. 9D, if a relay UE 93 determines that the relay is finished in operation 931, the relay UE 93 may request an MME 94 to release the resource allocation for the relay by sending a PDN disconnection-related message to the MME 94 in operation 933 or sending a resource modification-related message for a bearer to the MME 94 in operation 935. In a case where the relay operation of the remote UE, to which the relay UE 93 provides the relay function, is finished, and there is no remote UE that uses the PDN connection established for the relay, the relay UE 93 may release the PDN connection established for the relay through the PDN disconnection request of operation 933. As another example, if the relay operation of the remote UE, to which the relay UE 93 provides the relay function, is finished, the relay UE 93 may release the bearer resources established for the relay through the bearer resource modification of operation 935 to release the bearer resources used for the relay. As another example, if the relay UE 93 has transmitted/received a relay packet to/from the remote UE, to which the relay UE 93 provides the relay function, through WLAN direct, the relay UE 93 may adjust the relay resources without modification of the network resources since information about the WLAN direct connection is not known to the network. In this case, operation 933 or 935 may be omitted.

Figure 9E:
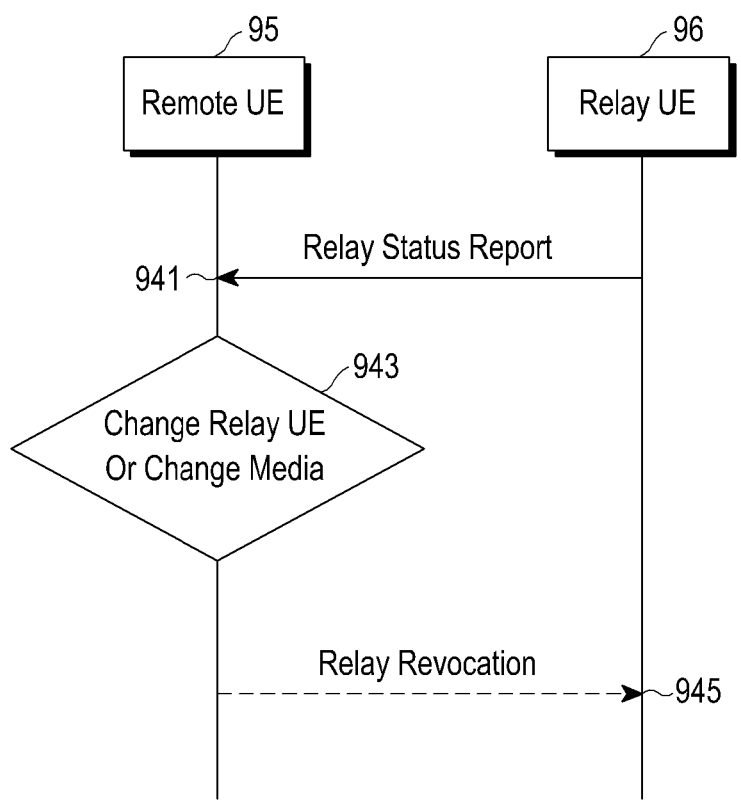
FIG. 9E is a flowchart of a method for making changes in a relay UE or data to be relayed based on a relay status report according to an embodiment of the present disclosure.

FIG. 9E is a flowchart of a procedure for making changes in a relay UE or data to be relayed based on a relay status report according to an embodiment of the present disclosure.

Referring to FIG. 9E, a procedure is illustrated in which a relay UE 96 sends a relay status report to a remote UE 95, and performs relay revocation or relay release based on the relay status report. The relay UE 96 may undergo a change in various states while performing relay functions. For example, the relay UE 96 may increase/decrease in the number of remote UEs 95 to which the relay UE 96 provides the relay function, a change in the available capacity of APN-aggregate maximum bitrate (AMBR) that the relay UE 96 is allocated for transmission of a relay packet to the network, a change in the battery status of the relay UE 96, and a change in signal strength (low electric field/high electric field) of a mobile communication signal of the relay UE 96. Therefore, the relay UE 96 may deliver its own relay status at every predetermined time, or the relay UE 96 may deliver the relay status report to the remote UE 95 in operation 941, if the relay UE 96 determines that the states of specific information or several information items in the information about its relay service provision status are changed to be poor, or if the relay UE 96 determines that the states of specific information or several information items in the information about its relay service provision status have improved. Information included in the relay status report may include information about at least one of the number of currently connected remote UEs, the available APN-AMBR, the battery status (e.g., the remaining battery capacity, the power connected, and the like), and the electric field strength (low/high). The information that can be included in the relay status report may include a variety of information capable of indicating the status of the relay UE, in addition to the above-described information. The information about the number of currently connected remote UEs represents the number of remote UEs, which are currently connected to the relay UE to receive the relay service. The available APN-AMBR represents the available AMBR among the APN-AMBRs of the PDN connection that the relay UE uses for relay functions. The battery status may indicate the remaining charging capacity of the battery of the relay UE in percentages (%), or may calculate the battery consumption due to the provision of the relay service and indicate the remaining charging capacity in terms of the expected time, or may indicate whether the relay UE is connected or not connected to power. The electric field strength represents the strength (e.g., high electric field/low electric field) of a radio signal that the relay UE receives from the mobile communication network. In addition, the relay status report may include QoS information (e.g., information about at least one of video streaming, data communication, voice communication, short message service (SMS) and the like) that can be provided by the relay UE. The relay status report including the above information or other relay UE status information may be transmitted to the remote UE 95 in operation 941. Upon receiving the relay status report, the remote UE 95 may determine the status of the relay UE 96 based on the relay status report in operation 943. If the status of the relay UE 96 is not good, the remote UE 95 may determine whether to find another relay UE to change the relay UE, or if the status of the relay UE is not good while the remote UE 95 uses, as Relay, the data service requiring a high bitrate such as video streaming, the remote UE 95 may determine to switch to the data service requiring a low bitrate. Further, in operation 943, if the status of the relay UE 96 is good while the remote UE 95 uses, as Relay, the data service requiring a low bitrate, the remote UE 95 may perform an operation of switching to the data service of a high bitrate. If the remote UE 95 that has received the relay status report switches to another relay UE, determining that the status of the relay UE 96 is insufficient to keep the relay service, then the remote UE 95 may transmit a message for relay revocation or relay release to the relay UE 96 in operation 945.

The message for relay revocation or relay release described above may be delivered on a user datagram protocol/Internet protocol (UDP/IP) layer. When a remote UE and a relay UE establish a relay connection, the remote UE and the relay UE may allocate IP addresses or establish a WLAN direct connection, and the remote UE and the relay UE separately use a port for a ProSe layer for delivering a message for the relay revocation or relay release, and a port for delivering a relay packet. That is, a port for delivering a control message and a port for delivering a data packet may be used separately. Therefore, UDP/IP packets delivered to the port for delivering a message for the relay revocation or relay release correspond to a message for the relay revocation or relay release, and the remote UE and the relay UE may perform the operations as in the embodiments of FIGS. 9A to 9E, using the packet delivered to the corresponding port. As another example, the message for the relay revocation or relay release may be transmitted in the network layer 2. In this case, the remote UE and the relay UE, when exchanging packets with each other, may require an indication for indicating whether the packets contain control data or contain data for relay operation, and may follow a message protocol for indicating this indication in the layer 2 message format.

In addition, although not shown, the UE that performs the operations in the embodiments of the present disclosure may be implemented to include a communication interface (or transceiver) for D2D communication, and a controller for controlling an operation of the UE so as to perform the communication method according to at least one of the embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A communication method in a wireless communication system supporting device-to-device (D2D) communication, the communication method comprising:
 transmitting, by a remote user equipment (UE), a discovery message including information about the remote UE that transmits the discovery message and information for identifying a relay service to discover a relay UE that supports a relay function in the D2D communication, the information for identifying the relay service including a service code configured in the remote UE for indicating the relay service for public safety in the D2D communication;
 in response to the discovery message, receiving, by the remote UE, a discovery response message generated by a prose manager included in the relay UE thereby completing a direct discovery process; and
 establishing, by the remote UE, a connection with the relay UE receiving the discovery message based on information obtained during the direct discovery process.

2. The communication method of claim 1, wherein the discovery message is transmitted for a direct discovery for the public safety.

3. The communication method of claim 1, wherein the connection with the relay UE is released by initiating of the remote UE or the relay UE.

4. The communication method of claim 3, wherein the release of the connection is based on at least one of a battery status and a loss of the connection.

5. The communication method of claim 1, wherein the discovery response message includes information about the relay UE.

6. The communication method of claim 1, wherein the remote UE receives the discovery response message only from the relay UE among a plurality of relay UEs in a D2D communication range that determines the received service code as the service code of the relay UE.

7. A user equipment (UE) in a wireless communication system supporting device-to-device (D2D) communication, the UE comprising:
 a transceiver configured to transmit and receive data using the D2D communication; and
 a controller configured to:
  transmit a discovery message including information about the UE that transmits the discovery message and information for identifying a relay service to discover a relay UE that supports a relay function in the D2D communication, the information for identifying the relay service including a service code configured in the UE for indicating the relay service for public safety in the D2D communication,
  in response to the discovery message, receive a discovery response message generated by a prose manager included in the relay UE thereby completing a direct discovery process, and
  establish a connection with the relay UE receiving the discovery message based on information obtained during the direct discovery process.

8. The UE of claim 7, wherein the discovery message is transmitted for a direct discovery for the public safety.

9. The UE of claim 7, wherein the controller is further configured to release the connection with the relay UE, by initiating of the UE or the relay UE.

10. The UE of claim 9, wherein the release of the connection is based on at least one of a battery status and a loss of the connection.

11. The UE of claim 7, wherein the discovery response message includes information about the relay UE.

12. The UE of claim 7, wherein the UE receives the discovery response message only from the relay UE among a plurality of relay UEs in a D2D communication range that determines the received service code as the service code of the relay UE.

13. A communication method in a wireless communication system supporting device-to-device (D2D) communication, the communication method comprising:
 receiving, by a relay user equipment (UE), a discovery message including information about a remote UE that transmits the discovery message and information for identifying a relay service, the discovery message for discovering the relay UE that supports a relay function in the D2D communication, the information for identifying the relay service including a service code configured in the remote UE for indicating the relay service for public safety in the D2D communication;

in response to receiving the discovery message generated by a prose manager included in the relay UE, transmitting, by the relay UE, a discovery response message to the remote UE thereby completing a direct discovery process; and establishing, by the relay UE, a connection with the remote UE transmitting the discovery message based on information obtained during the direct discovery process.

14. The communication method of claim 13, wherein the discovery message is transmitted for a direct discovery for the public safety.

15. The communication method of claim 13, wherein the connection with the remote UE is released by initiating of the remote UE or the relay UE.

16. The communication method of claim 15, wherein the release of the connection is based on at least one of a battery status and a loss of the connection.

17. The communication method of claim 13, wherein the discovery response message includes information about the relay UE.

18. The communication method of claim 13, wherein the remote UE receives the discovery response message only from the relay UE among a plurality of relay UEs in a D2D communication range that determines the received service code as the service code of the relay UE.

19. A user equipment (UE) in a wireless communication system supporting device-to-device (D2D) communication, the UE comprising:

a transceiver configured to transmit and receive data using the D2D communication; and a controller configured to:

receive a discovery message including information about a remote UE that transmits the discovery message and information for identifying a relay service, the discovery message for discovering the UE as a relay UE that supports a relay function in the D2D communication, the information for identifying the relay service including a service code configured in the remote UE for indicating the relay service for public safety in the D2D communication, in response to receiving the discovery message generated by a prose manager included in the UE, transmit a discovery response message to the remote UE thereby completing a direct discovery process, and establish a connection with a remote UE transmitting the discovery message based on information obtained during the direct discovery process.

20. The UE of claim 19, wherein the discovery message is transmitted for a direct discovery for the public safety.

21. The UE of claim 19, wherein the connection with the remote UE is released by initiating of the remote UE or the relay UE.

22. The UE of claim 21, wherein the release of the connection is based on at least one of a battery status and a loss of the connection.

23. The UE of claim 19, wherein the discovery response message includes information about the relay UE.

24. The UE of claim 19, wherein the remote UE receives the discovery response message only from the relay UE among a plurality of relay UEs in a D2D communication range that determines the received service code as the service code of the relay UE.

* * * * *